(12) United States Patent
Kawai et al.

(10) Patent No.: US 7,475,044 B1
(45) Date of Patent: Jan. 6, 2009

(54) ELECTRONIC MONEY SYSTEM AND ELECTRONIC MONEY TERMINAL DEVICE

(75) Inventors: Shigeyuki Kawai, Tokyo (JP); Koji Ito, Kanagawa (JP)

(73) Assignee: Sony Corporation (JP)

( * ) Notice: Subject to any disclaimer, the term of this patent is extended or adjusted under 35 U.S.C. 154(b) by 1121 days.

(21) Appl. No.: 09/720,079

(22) PCT Filed: Apr. 21, 2000

(86) PCT No.: PCT/JP00/02622

§ 371 (c)(1), (2), (4) Date: Mar. 29, 2001

(87) PCT Pub. No.: WO00/65547

PCT Pub. Date: Nov. 2, 2000

(30) Foreign Application Priority Data

Apr. 21, 1999 (JP) ................................. 11-113471

(51) Int. Cl.
- H04K 1/00 (2006.01)
- H04L 9/00 (2006.01)
- G06Q 20/00 (2006.01)
- G06Q 30/11 (2006.01)
- G06K 5/00 (2006.01)

(52) U.S. Cl. ............................. 705/65; 705/16; 705/26; 705/64; 235/380

(58) Field of Classification Search ................... 705/38, 705/64, 41, 16, 26, 65; 235/380
See application file for complete search history.

(56) References Cited

U.S. PATENT DOCUMENTS

| 5,010,238 | A | 4/1991 | Kadono et al. |
| 5,850,442 | A | 12/1998 | Muftic |
| 5,875,437 | A | 2/1999 | Atkins |
| 5,949,880 | A * | 9/1999 | Curry et al. ................... 705/66 |
| 5,991,747 | A * | 11/1999 | Tomoyuki et al. ............. 705/41 |

(Continued)

FOREIGN PATENT DOCUMENTS

EP 0 793 186 A2 9/1997

(Continued)

OTHER PUBLICATIONS

Kogo Mutsuda, World's First ISO/IEC10536 Compatible Contactless IC card was Developed for the Implementation of Electronic Commerce, Aug. 7, 1997, New Media Development Association, entire document.*

(Continued)

Primary Examiner—Andrew J Fischer
Assistant Examiner—Mamon Obeid
(74) Attorney, Agent, or Firm—Rader Fishman & Grauer PLLC; Ronald P. Kananen

(57) ABSTRACT

The present invention offers an electronic money system and electronic money terminal that allow the user who uses an installment payment plan to decide the installment amount each time he/she pays it.

Instead of debiting the amount data equivalent to consumption from an information card 50, the present invention accumulates the amount data equivalent to consumption as data on the transaction history of installment payments, receives part or all of the accumulated installment balance as an installment amount, subtracts the received installment amount from the installment balance to determine a new balance, and thereby allows the user to pay any part of the installment balance as an installment amount.

23 Claims, 25 Drawing Sheets

U.S. PATENT DOCUMENTS

| | | | |
|---|---|---|---|
| 6,032,857 A | | 3/2000 | Kitagawa et al. ............ 235/379 |
| 6,041,412 A | * | 3/2000 | Timson et al. .............. 713/200 |
| 6,058,382 A | * | 5/2000 | Kasai et al. .................. 705/41 |
| 6,064,987 A | * | 5/2000 | Walker et al. ................. 705/38 |
| 6,330,548 B1 | * | 12/2001 | Walker et al. ................. 705/38 |
| 6,502,078 B2 | * | 12/2002 | Kasai et al. .................. 705/41 |
| 6,728,686 B2 | * | 4/2004 | Kasai et al. .................. 705/41 |

FOREIGN PATENT DOCUMENTS

| | | |
|---|---|---|
| EP | 0 856 821 A2 | 8/1998 |
| GB | 2 310 944 A | 9/1997 |
| JP | 2-17597 | 1/1990 |
| JP | 9-237298 | 9/1997 |
| JP | 10-255121 | 9/1998 |
| JP | 10-307951 | 11/1998 |
| WO | WO 96/33476 | 10/1996 |

OTHER PUBLICATIONS

Supplementary European Search Report, May 17, 2006.
Summons to Attend Oral Proceedings Pursuant to Rule 112 (1) EPC dated May 16, 2008 for corresponding European Application No. 00 919 144.6.

* cited by examiner

A

| | DESCRIPTION | byte |
|---|---|---|
| D23₁ — 1 | Card Transaction S/N (A) | 32byte |
| D23₂ — 2 | Log Type | |
| 3 | (Reserved) | |
| D23₃ — 4 | Data/Time | |
| D23₄ — 5 | Terminal Number | |
| D23₅ — 6 | Dealing Value (unsigned) | |
| 7 | Card Transaction S/N (B) | |
| D23₆ — 8 | Signature1 Key Version | |
| D23₇ — 9 | Balance Data | |
| D23₈ — 10 | Terminal Transaction S/N | |
| 11 | (Reserved) | |
| D23₉ — 12 | Signature1 | |

B

| | | byte |
|---|---|---|
| D23A₁ — 13 | Card IDm | 16byte |
| D23A₂ — 14 | Terminal Transaction Flag | |
| 15 | (Reserved) | |
| D23A₃ — 16 | Signature2 Key Version | |
| D23A₄ — 17 | Signature2 | |

FIG. 15

| | DESCRIPTION | byte |
|---|---|---|
| D581 → 1 | Negative List Type | |
| 2 | (Reserved) | |
| D582 → 3 | Date (registered) | |
| D583 → 4 | Date (start) | 32byte |
| D584 → 5 | Date (end) | |
| D585 → 6 | Card IDm | |
| 7 | (Reserved) | |
| D586 → 8 | Signature key Version | |
| D587 → 9 | Signature | |

D58

ELECTRONIC MONEY SYSTEM AND ELECTRONIC MONEY TERMINAL DEVICE

TECHNICAL FIELD

The present invention relates to an electronic money system and electronic money terminal. It is preferably applied to electronic money systems and electronic money terminals that use information cards storing amount data on them.

BACKGROUND ART

Conventionally, when a user uses a cash card or credit card issued by a bank, credit company, or the like at a store where a card terminal that accepts the card has been installed, the clerk at the store makes the card terminal read the card number stored on the magnetic stripe of the card and enters the transaction amount.

At this time, the card terminal connects to a communication line and sends information such as the card number and transaction amount to the management computer at the bank or credit company. The management computer at the bank or credit company manages such information as whether the card has been expired, whether the credit limit has been reached, and whether the card has been reported lost, and determines whether the card can be used, based on the card-number and payment-amount information received from the card terminal via the communication line. If it is determined that the card can be used, the management computer at the bank or credit company returns usage permission information to the sender card terminal while performing a procedure for debiting the transaction amount from the specified account of the card.

There is a problem with a system that employs such cash cards or credit cards: each time the user uses his/her card, the card terminal must send a request for approval to use the card to the management computer at the bank or credit company, creating a need to connect to a communication line and thus complicating the processing of card transactions.

If a user wants to use an installment payment plan via credit card, he/she makes an arrangement for direct debit with the credit company and the credit company automatically debits the fixed amount decided by the arrangement from the user's account on a fixed day every month. Therefore, the user must decide the amount of each installment in advance and it is difficult for him/her to decide the amount freely when making each payment.

DISCLOSURE OF THE INVENTION

The present invention has been made in view of the above problems and intends to offer an electronic money system and electronic money terminal that allow the user who uses an installment payment plan to decide the amount each time he/she makes a payment.

To solve this problem, the present invention accumulates the amount data equivalent to consumption as data on the transaction history of installment payments, receives part or all of the accumulated installment balance as an installment amount, subtracts the received installment amount from the installment balance to determine a new balance, and thereby allows the user to pay any part of the installment balance as an installment amount.

BRIEF DESCRIPTION OF THE DRAWINGS

FIG. 15 is a schematic view showing the structure of electronic money log data.

BEST MODE FOR CARRYING OUT THE INVENTION

An embodiment of the present invention will be described below with reference to the drawings.

(1) Configuration of the Electronic Money System

Figure 1:
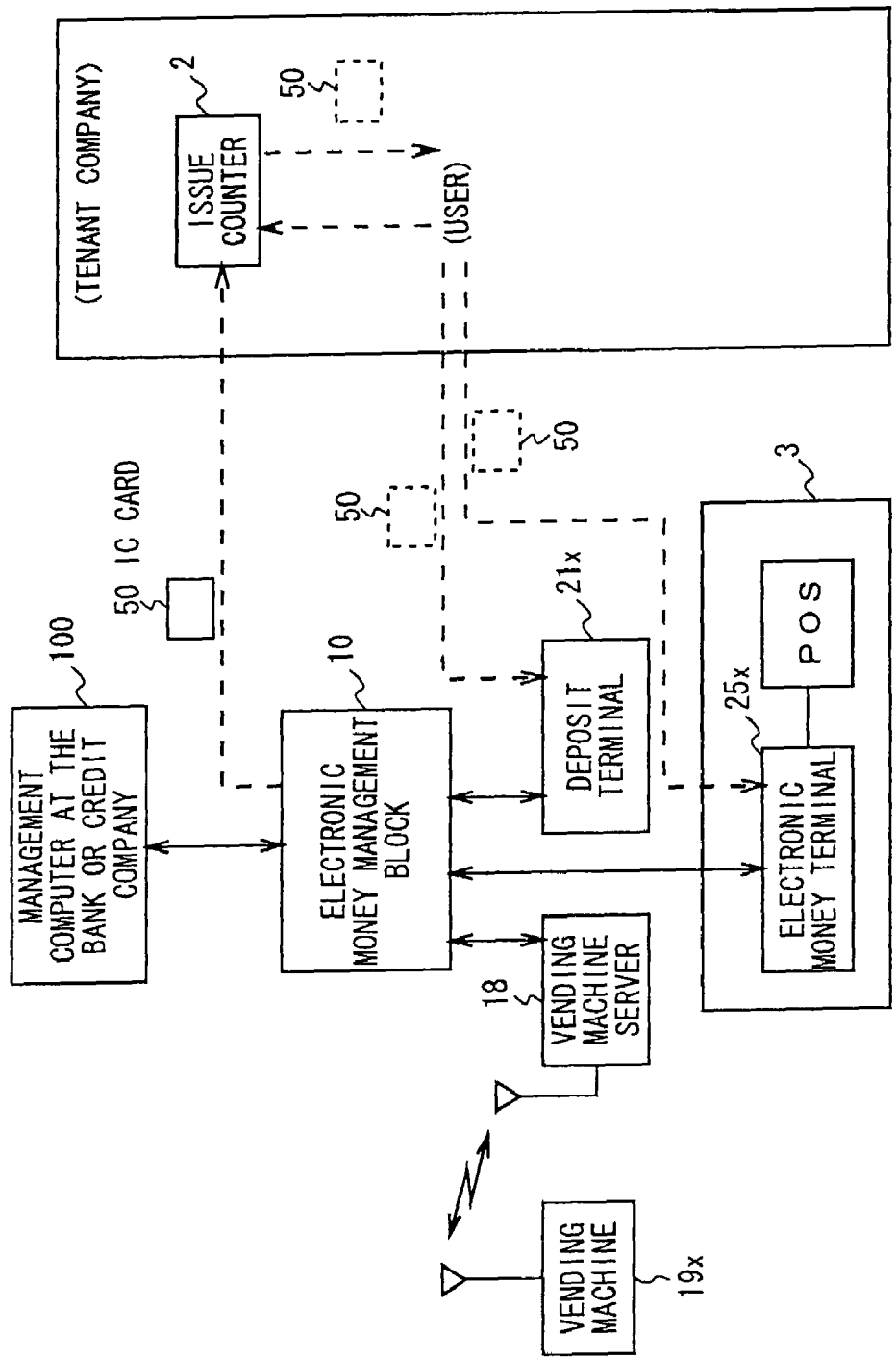
FIG. 1 is a block diagram showing the general configuration of the electronic money system according to the present invention.

FIG. 1 generally shows the electronic money system 1 which comprises an electronic money management block 10 that issues IC cards 50, manages electronic money, and settles accounts; deposit terminals $21_x$ that put electronic money (amount data) into the IC cards 50; an electronic money terminal $25_x$ at each store 3 that receives payments from users through the IC cards 50 into which the electronic money has been put; vending machines $19_x$ for users to buy goods using the IC card 50; and a vending machine server 18 that receives and accumulates the transaction histories (transaction amounts, dates and times, etc.) of the IC cards 50 from the vending machines $19_x$. There are multiple deposit terminals $21_x$, electronic money terminals $25_x$, and vending machines $19_x$.

Figure 2:
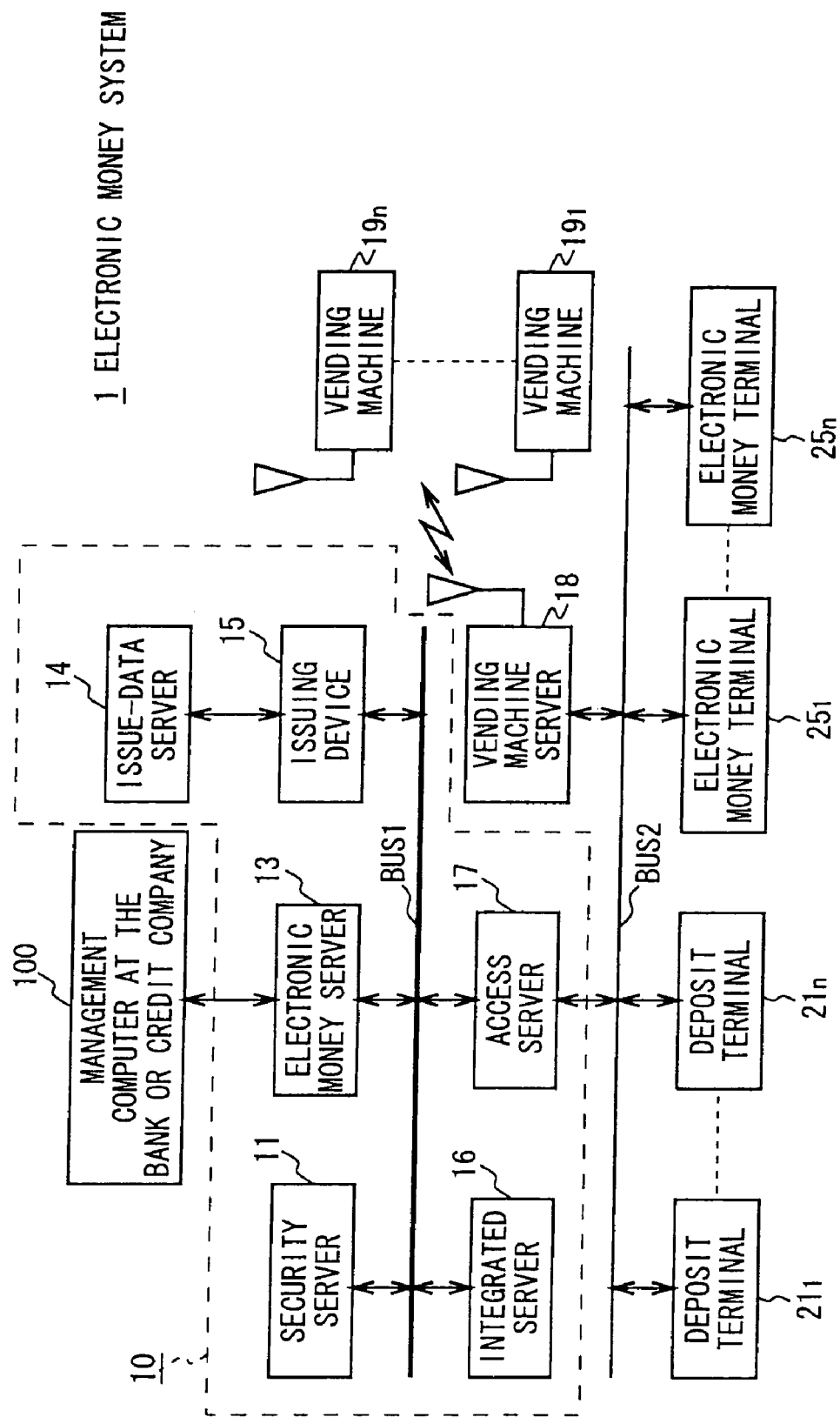
FIG. 2 is a block diagram showing the configuration of an electronic money management block.

As shown in FIG. 2, in the electronic money management block 10, various servers (security server 11, electronic money server 13, issue-data server 14, issuing device 15, integrated server 16, access server 17, and vending machine server 18) are connected to the data bus BUS1 that forms a first LAN (local area network) and various terminals (deposit terminals $21_1$ to $21_n$, electronic money terminals $25_1$ to $25_n$, and vending machines $19_1$ to $19_n$) are connected to the data bus BUS2 that forms a second LAN. The first LAN and second LAN are connected through the access server 17.

Figure 3:
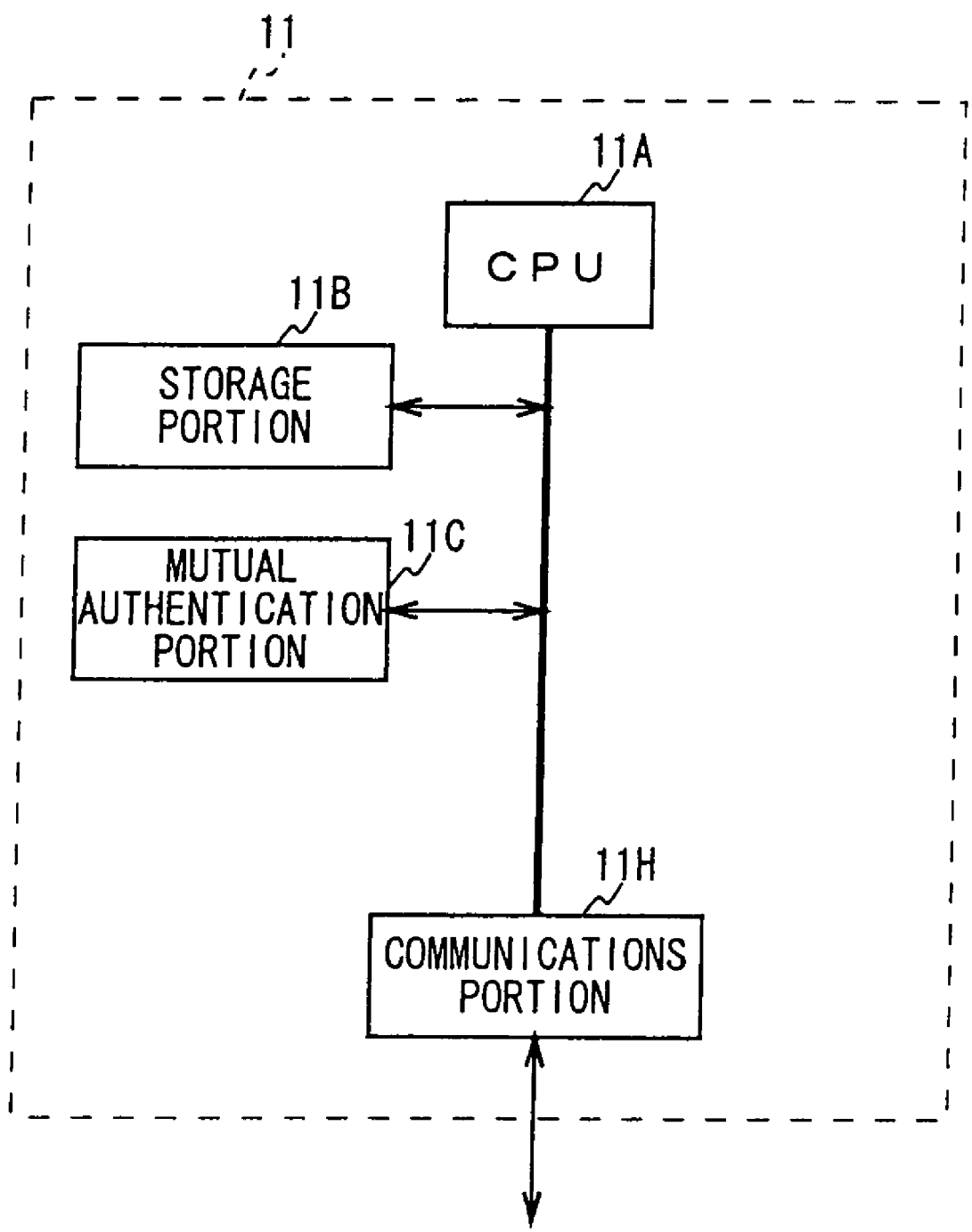
FIG. 3 is a block diagram showing the configuration of a security server.

In the electronic money management block 10, the security server 11 comprises a CPU 11A that operates according to an operation program stored in a storage portion 11B, as shown in FIG. 3. For data exchange between the integrated server 16 and other terminals or servers, the CPU 11A enters, through a communications portion 11H, the data to be exchanged, performs encryption using a proper encryption key, and carries out authentication of the communication partner via a mutual authentication portion 11C.

Figure 4:
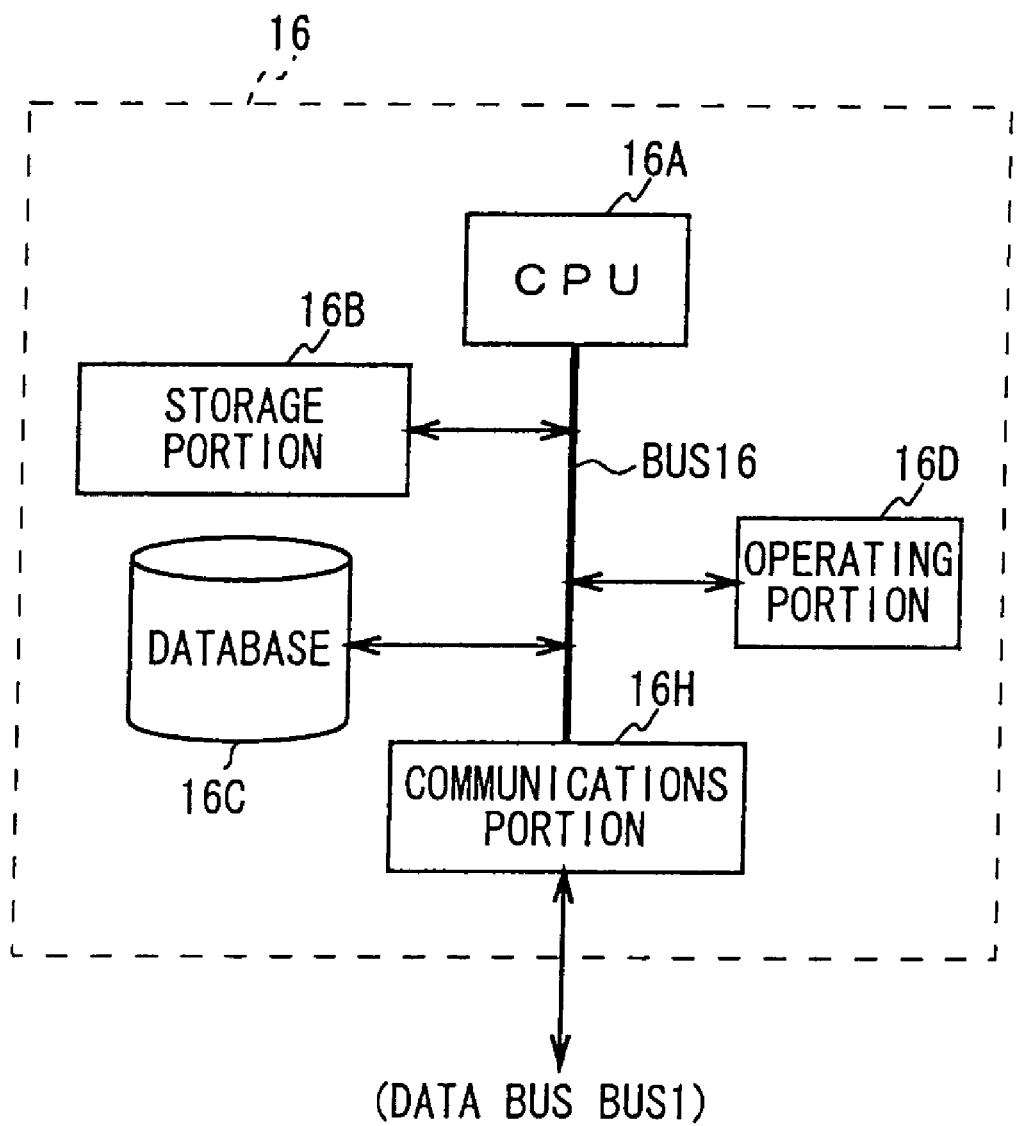
FIG. 4 is a block diagram showing the configuration of an integrated server.

As shown in FIG. 4, the integrated server 16 comprises a CPU 16A that operates according to an operation program stored in a storage portion 16B. It captures the transaction history information such as the amount data entered through the deposit terminals $21_1$ to $21_n$ and the transaction histories (IC card numbers, transaction amounts, dates and times, etc.) of the IC cards 50 accumulated in the respective electronic money terminals $25_1$ to $25_n$ from a communications portion 16H through the second LAN, access server 17, first LAN, and security server 11, and stores them in a database 16C through a data bus BUS16.

Also, the integrated server 16 has been designed to store the data, supplied by the management computer 100 at the bank or credit company, about the amounts debited automatically from users' specified accounts, in the database 16C through the electronic money server 13.

The electronic money server 13 exchanges data with the external computer 100 at the bank or credit company through an appropriate communication line and settles accounts, for example, once a month, based on various electronic money information stored in the database 16C of the integrated server 16.

The issue server 14 registers the combination of the IC card number of the IC card 50 issued by the issuing device 15 and the credit card number of the user who possesses the IC card 50 in a database.

The vending machine server 18 accumulates the transaction histories (transaction amounts, dates and times, etc.) of the IC cards 50 received from vending machines $19_1$ to $19n$ and stores them in the database 16C of the integrated server 16 through the second LAN, access server 17, first LAN, and security server 11, for example, once a day.

In this electronic money system 1, the issuing device 15 in the electronic money management block 10 issues contactless read/write IC (integrated circuit) cards 50 and distributes them to users through issue counters 2 (FIG. 1) at tenant companies. The IC card 50 has a memory and each IC card stores a unique IC card number in its memory.

Figure 5:
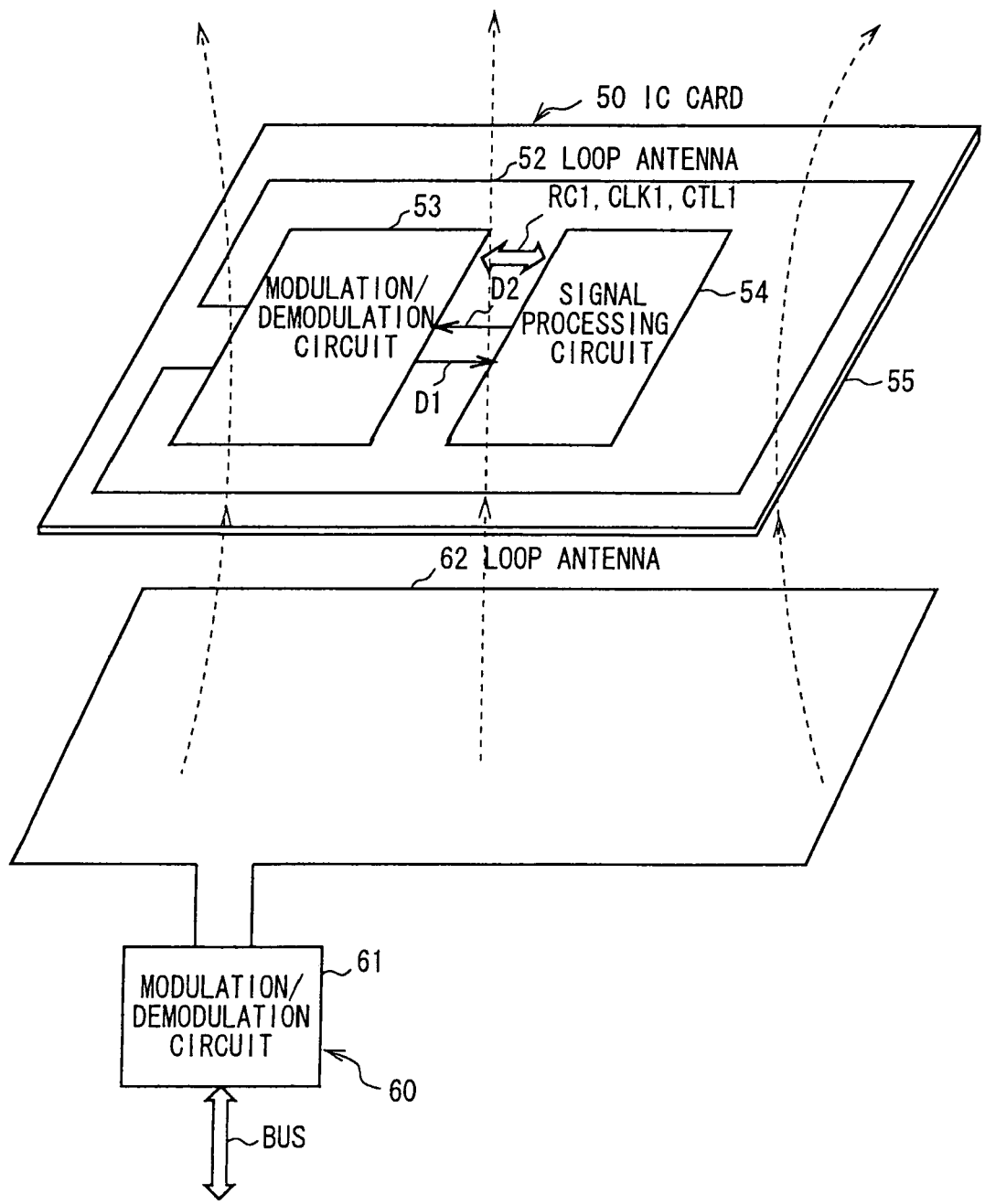
FIG. 5 is a schematic perspective view showing the configuration of an information card.
Figure 6:
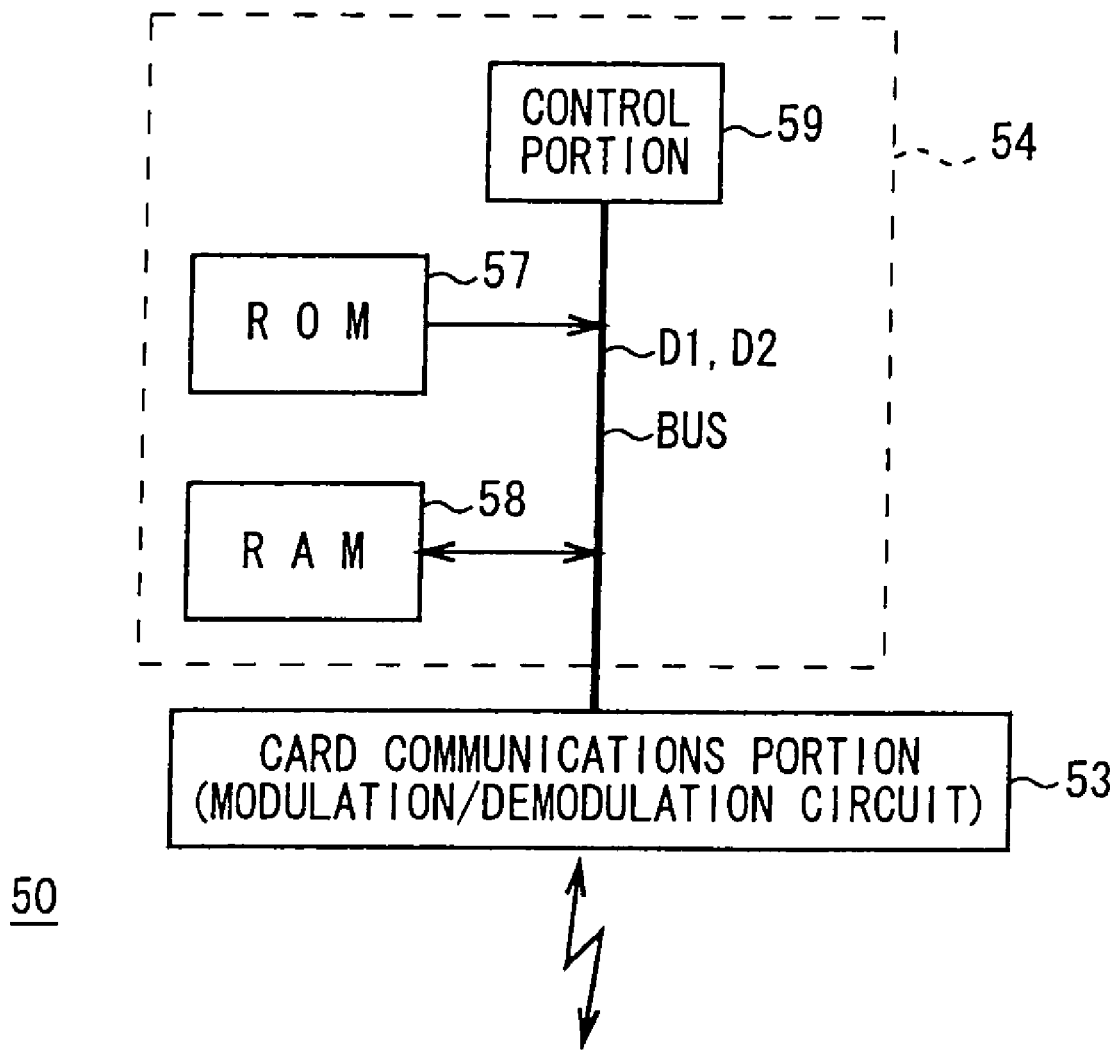
FIG. 6 is a block diagram showing the configuration of the information card.

Thus, the IC card 50 is a batteryless IC card that does not have a battery for power supply, as shown in FIGS. 5 and 6. It comprises a coiled loop antenna 52 for receiving the electromagnetic waves emitted by a data reader/writer 60 and converting them into electrical signals, modulation/demodulation circuit 53 for modulating send data or demodulating receive data, and control portion 54 for analyzing receive data and generating send data, all of which are mounted, for example, on a planar board 55.

The IC card 50 receives, with the loop antenna 52, the electromagnetic waves emitted by the data reader/writer 60 and sends them to the modulation/demodulation circuit 53 as modulated waves. The modulation/demodulation circuit 53 demodulates the modulated waves and supplies them to the signal processing circuit 54 as send data D1 sent by the data reader/writer 60.

The signal processing circuit 54 incorporates a control portion 59 consisting of a hard logic circuit or CPU (central processing unit) and memory portion consisting of a ROM (read only memory) 57 and RAM (random access memory) 58. The control portion 59 analyzes the send data D1 on the RAM 58 according to a program written on the ROM 57, reads various data D2 about electronic money stored in the RAM 58, based on the analyzed data D1, and sends out the data D2 to the modulation/demodulation circuit 53, which then modulates the data D2 and emits it as electromagnetic waves to the data reader/writer 60 through the loop antenna 52 (FIG. 5).

The modulation/demodulation circuit 53 incorporates a power supply circuit for converting the energy of electromagnetic waves into a stable direct-current power supply. It has been designed to generate a direct-current power supply DC1 using the power supply circuit, based on the electromagnetic waves emitted by the data reader/writer 60 and received by the loop antenna 52, supply it to the control portion 59, supply the clock signal CLK1 generated based on the received electromagnetic waves to the control portion 54, and receive control signals CTL1 for various types of control from the control portion 54.

The data reader/writer 60 inputs the various send data supplied through data bus BUS into a modulation/demodulation circuit 61. Then the modulation/demodulation circuit 61 modulates the send data using a carrier in an appropriate frequency band that can emit them efficiently as electromagnetic waves, and emits them as electromagnetic waves through a loop antenna 62.

Also, the data reader/writer 60 receives, with the loop antenna 62, the electromagnetic waves emitted by the IC card 50 and supplies them as modulated waves to the modulation/demodulation circuit 61. Then the modulation/demodulation circuit 61 demodulates the modulated waves and supplies them as the data sent from the IC card 50 to a signal processing portion (not shown) via the data bus BUS.

Figure 7:
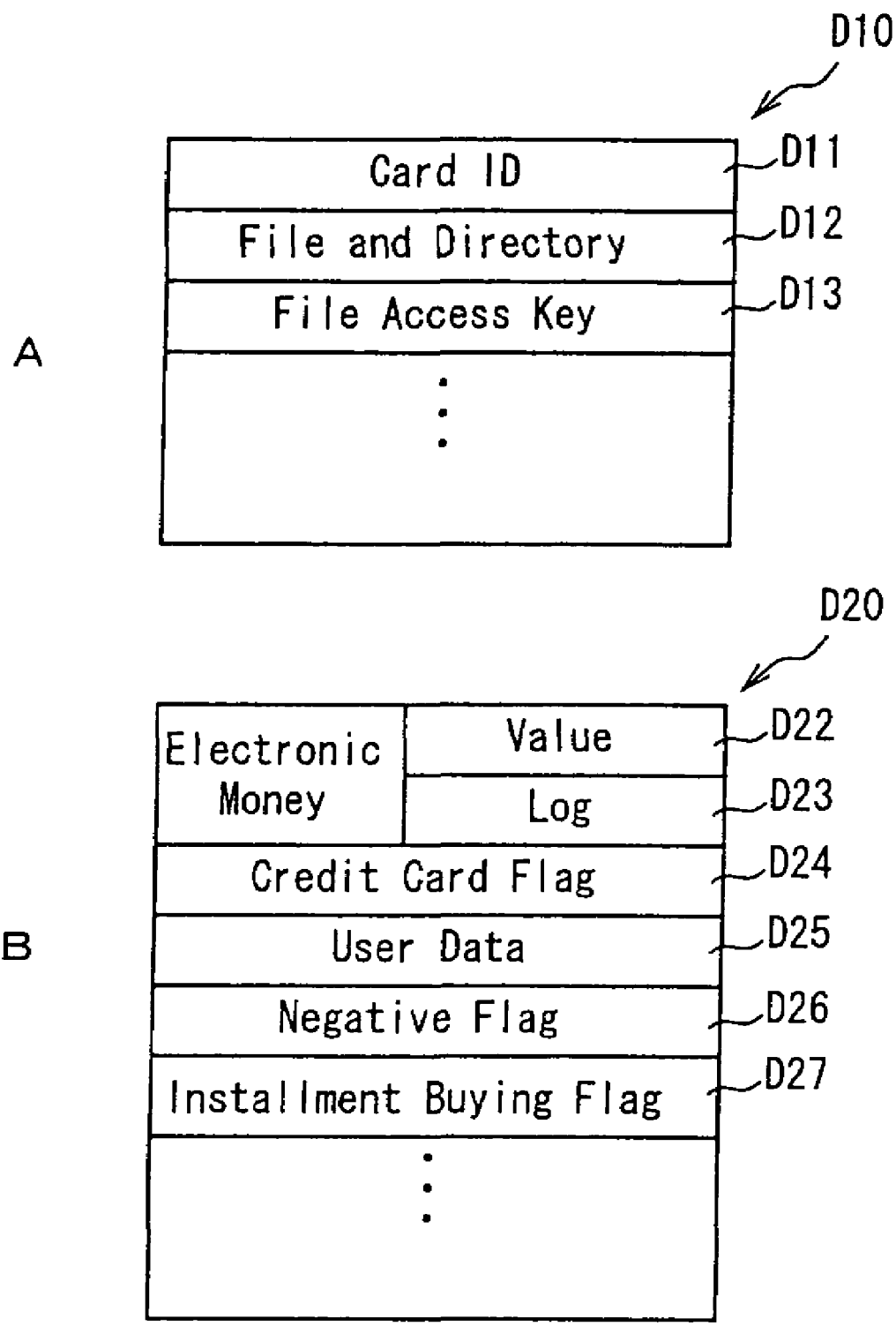
FIG. 7 is a schematic view showing the data written into the information card.

The RAM 58 of the IC card 50 has been designed to store various electronic money information, which is stored in a plurality of files managed as a directory. In other words, the RAM 58 of the IC card 50 stores control information D10 consisting of the IC card number D11, file and directory definition information D12, and a file access key D13, as shown in FIG. 7A, which are higher-order information in the directory structure, as well as electronic money information D20, as shown in FIG. 7B, which is lower-order information in the directory structure. As the electronic money information D20, the following data is written into each file: balance data D22 which represents electronic money balance, electronic money log data D23 which represents the transaction history of the electronic money, a Credit Card flag (described later) D24 which specifies in advance at the time of the distribution of the IC card 50 whether the shortfall can be charged to a credit card account if the balance data D22 is insufficient for a transaction amount during IC-card 50 shopping, other user information (employee number and entrance/exit data) D25, a Negative flag D26 described later, and an Installment Buying flag D27 which specifies at the time of the distribution of the IC card 50 whether the user can select payment in installments when he/she uses the IC card 50 for shopping.

Figure 8:
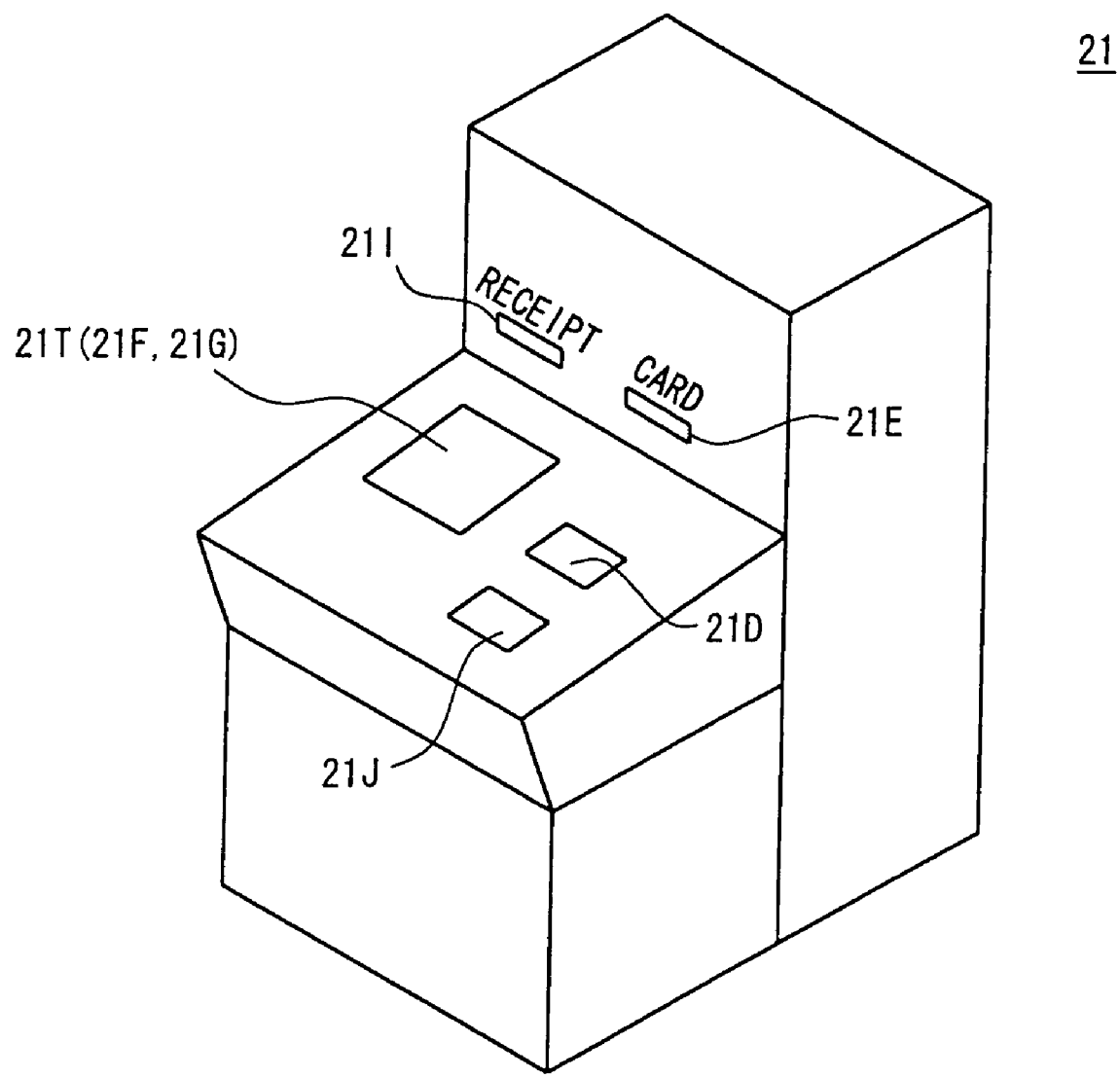
FIG. 8 is a perspective view showing the appearance of a deposit terminal.

The user supplied with such an IC card 50 enters the amount data (electronic money) for a desired amount of cash into the IC card 50 on the deposit terminal $21_x$ shown in FIG. 1, using cash, a cash card, or a credit card. As shown in FIG. 8, the deposit terminal $21_x$ comprises, on its exterior, a card communications portion 21D (which has the same configuration as the loop antenna 62 and modulation/demodulation circuit 61 in FIG. 5) for contactless data exchange with the IC card 50, credit card communications portion 21E for reading data from the magnetic stripes of cash cards and credit cards 40, cash deposit portion 21J for depositing cash, touch panel 21T that combines a display portion 21F and operating portion 21G, and receipt output portion 21I that outputs receipts or deposit slips.

The methods of entering amount data (electronic money) into the IC card 50 on the deposit terminal $21_x$ include the method in which the user deposits cash into the cash deposit portion 21I of the deposit terminal $21_x$, which then writes the amount data equivalent to the deposited cash into the RAM 58 of the IC card 50, and the method in which the user inserts a cash card issued by a bank or credit card issued by a credit company into the credit card communications portion 21E and specifies a desired amount through the operating portion 21G in order for the deposit terminal $21_x$ to transfer the specified amount data to the IC card 50 from the specified account of the cash card or credit card. Incidentally, the term "cash card" herein means a card for using bank deposits and the term "credit card" herein means a card issued by a credit company to extend a certain amount of loans to the user.

Figure 9:
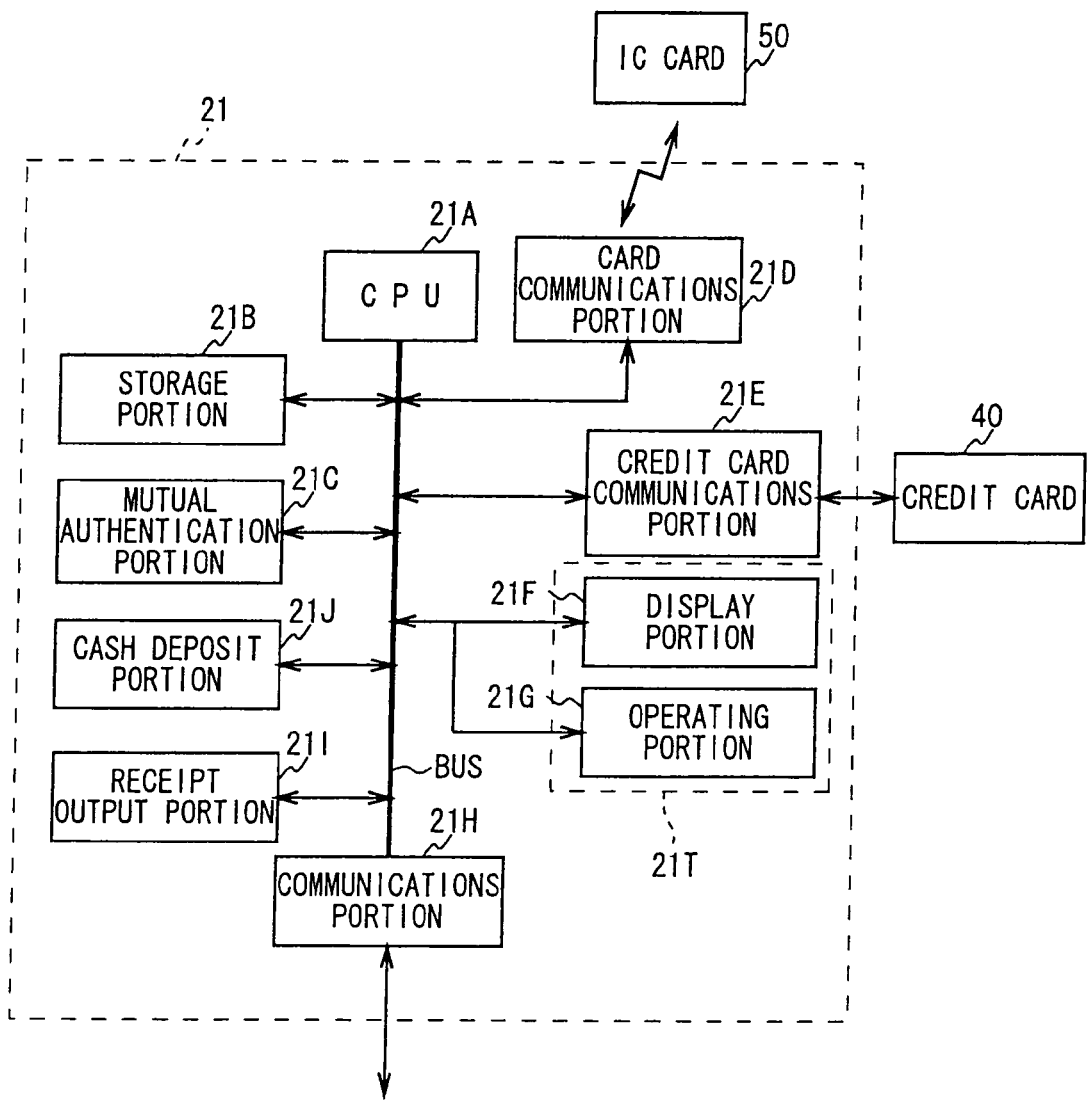
FIG. 9 is a block diagram showing the configuration of the deposit terminal.
Figure 10:
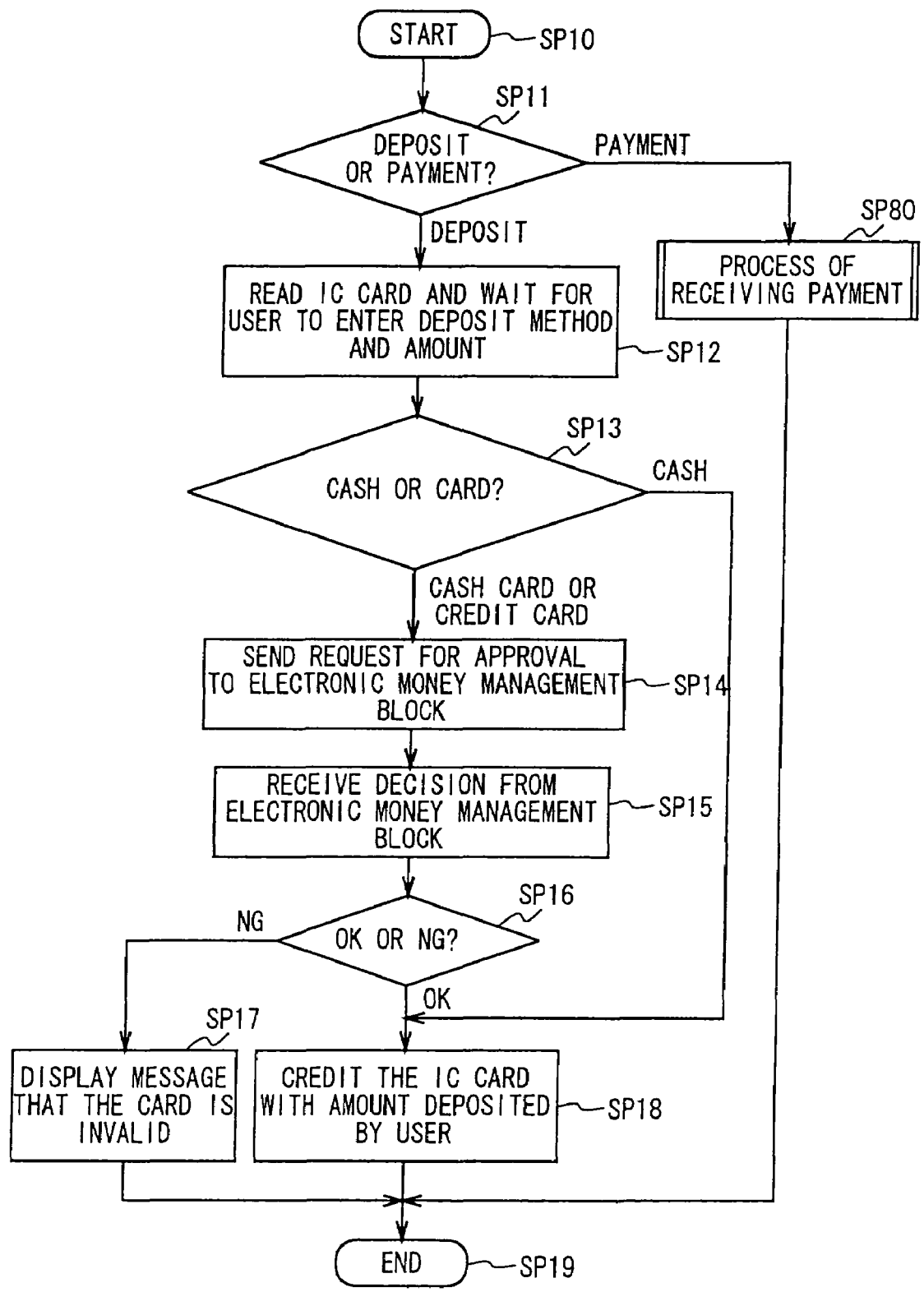
FIG. 10 is a flow chart showing the deposit/payment procedure on the deposit terminal.
Figure 11:
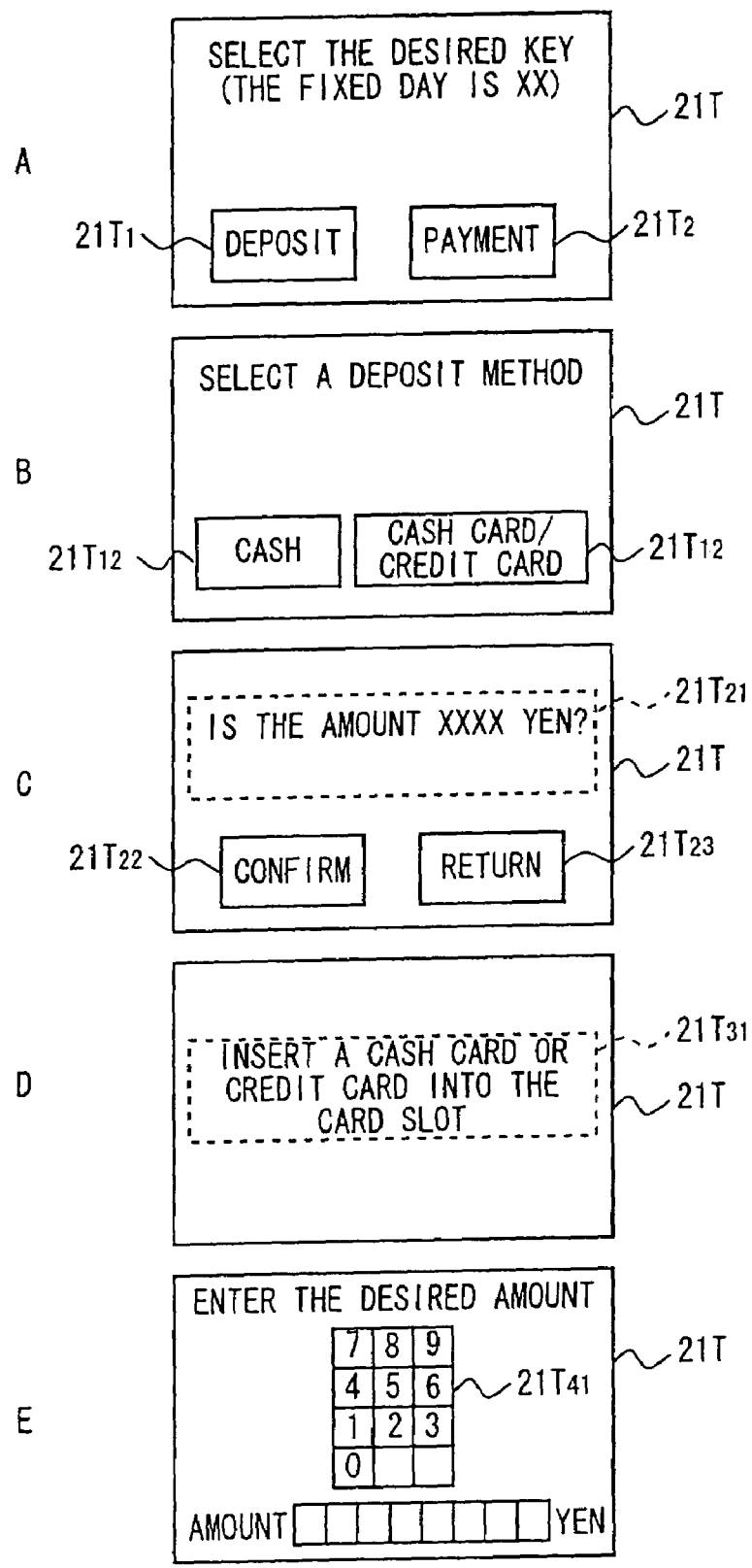
FIG. 11 is a schematic view showing a display example on the deposit terminal.

As shown in FIG. 9, in the deposit terminal $21_x$, a CPU 21A has been designed to perform the deposit/payment procedure shown in FIG. 10 according to a program stored in a storage portion 21B. As the user brings his/her IC card 50 close to the card communications portion 21D and starts a deposit/payment operation through the operating portion 21G, the CPU 21A starts the deposit/payment procedure in Step SP10 shown in FIG. 10 and determines in Step SP11 whether the user wants deposit processing for entering amount data (electronic money) into the IC card 50 or payment processing for making installment payments described later. In so doing, the CPU 21A of the deposit terminal $21_x$ displays selection screen for the user to select between deposit and payment, as shown in FIG. 11A, on the touch panel 21T. The user makes a selection by pressing a Deposit selection key $21T_1$ or Payment selection key $21T_2$. Incidentally, the touch panel 21T has been designed to remind the user of payments by displaying the fixed days, the pay days of installments.

Based on the user's selection, the CPU 21A of the deposit terminal $21_x$, decides between deposit processing and payment processing in Step SP11. If the user selects payment processing, the CPU 21A goes to Step SP80 and runs the process of receiving a payment described later.

On the other hand, if the user selects deposit processing, the CPU 21A goes to Step SP12, reads out information such as the card number from the IC card 50, and waits for the user to enter the deposit method via the touch panel 21T.

The CPU 21A displays a Cash selection key $21T_{11}$ and Cash Card/Credit Card selection key $21T_{12}$ on the touch panel 21T for selecting between cash and a cash card or credit card as shown in FIG. 11B and the user makes a selection by pressing the desired key.

If the user specifies cash deposit, the CPU 21A opens the lid of the cash deposit portion 21J and waits for the user to deposit cash. As the user deposits cash in the cash deposit portion 21J, the CPU 21A counts the amount of the deposited cash and displays the result of counting $21T_{21}$ on the touch panel 21T as shown in FIG. 11C. If the result of counting $21T_{21}$ is correct, the user indicates it to the CPU 21A by pressing a Confirm key $21T_22$ displayed on the touch panel 21T. If result of counting is wrong, the user indicates it by pressing a Return key $21T_{23}$ displayed on the touch panel 21T.

If the user presses the Confirm key $21T_22$, the CPU 21A goes to Step SP13 that follows Step 12, but if the user presses the Return key $21T_23$, the CPU 21A returns the cash to the cash deposit portion 21J and stops deposit processing.

If the user specifies the deposit method using a cash card or credit card 40 in Step SP12, the CPU 21A prompts the user to insert a cash card or credit card 40 into the credit card communications portion 21E by displaying an instruction $21T_{31}$ to insert a card on the touch panel 21T as shown in FIG. 11D and displays numeric keys $21T_{41}$ on the touch panel 21T as shown in FIG. 11E in order for the user to enter the desired amount.

If the deposit method specified by the user is a cash deposit, the CPU 21A goes to Step SP18 from Step SP13. At the same time, it sends the amount of the cash deposited by the user in the cash deposit portion 21J to the IC card 50 through the card communications portion 21D and sends and stores the amount data equivalent to this cash to the integrated server 16 in the electronic money management block 10 through a communications portion 21H. Consequently, the control portion 50 of the IC card 50 updates the balance data D22 (FIG. 7B) that represent the balance of this electronic money by adding the amount data received from the deposit terminal $21_x$ to the electronic money remaining in the RAM 58.

On the other hand, if the user specifies the deposit method based on a cash card or credit card 40, the CPU 21A moves from Step SP13 to Step SP14, reads out the credit card number from the magnetic stripes of the cash card or credit card 40 inserted into the credit card communications portion 21E, and sends it together with the personal identification number of the cash card or credit card 40 entered by the user through the operating portion 21G, a request for the use of the cash card or credit card 40, and the amount to be used, to the electronic money management block 10 (FIG. 1) through the communications portion 21H. At this time, the mutual authentication portion 21C of the deposit terminal $21_x$ determines whether the party the CPU 21A is communicating with is the legitimate communication partner.

Then the electronic money management block 10 sends, through a communication line, the credit card number, user-entered personal identification number, request for the use of the cash card or credit card 40, and amount to be used, received from the deposit terminal $21_x$, to the management computer 100 at the bank or credit company that manages cash cards or credit cards.

The management computer 100 at the bank or credit company manages the cash card numbers or credit card numbers and legitimate personal identification numbers of the cash cards and credit cards possessed by users. It accepts the request for the use of the credit card if the combination of the credit card number and user-entered personal identification number sent by the electronic money management block 10 is a legitimate combination.

The management computer 100 at the bank or credit company determines whether the card is valid, based on the balance in the account specified by the cash card number or credit card number received from the electronic money management block 10, the expiration date of the cash card or credit card 40, any loss report, etc.

If the specified amount is left in the specified account and the cash card or credit card 40 is valid, the management computer 100 at the bank or credit company approves the use of this amount, notifies the electronic money management block 10 to that effect, and transfers this amount from the specified account to the integrated server 16 of the electronic money management block 10. On the other hand, if the balance in the specified account is not enough to cover the specified amount or if the use of the card is not approved due to the expiration date of the cash card or credit card 40, a reported loss or for other reasons, the management computer 100 at the bank or credit company does not approve the use of this amount and notifies the electronic money management block 10 to that effect.

The electronic money management block 10 sends the decision of approval or disapproval to the deposit terminal $21_x$ and the CPU 21A of the deposit terminal $21_x$ receives it via the communications portion 21H in Step SP15 in FIG. 10.

If the decision is approval, the CPU 21A moves prom Step SP16 to Step SP18 and sends the amount specified by the user to the IC card 50. Consequently, the control portion 50 of the IC card 50 updates the balance data D22 (FIG. 7B) that represent the balance of this electronic money by adding the amount data received from the deposit terminal $21_x$ to the electronic money remaining in the RAM 58.

The CPU 21A prints out the receipt of the transaction from the receipt output portion 21I and finishes the deposit procedure in Step SP19.

If the decision received in Step SP15 is disapproval, the CPU 21A moves prom Step SP16 to Step SP17, displays in the display portion 21F of the touch panel 21T a message stating that the cash card or credit card 40 inserted into the credit card communications portion 21E by the user is invalid, and finishes the deposit procedure in Step SP19.

Thus, if the user enters desired amount data (electronic money) for the IC card 50 in cash, the amount data equivalent to the cash deposited is sent from the deposit terminal $21_x$ to the integrated server 16 of the electronic money management block 10 and stored there. If the user enters desired amount data (electronic money) for the IC card 50 using a cash card or credit card 40, the management computer 100 at the bank or credit company sends the amount data equivalent to the amount data (electronic money) entered for the IC card 50, from the account specified for the cash card or credit card 40 to the electronic money management block 10 and stores it in the integrated server 16.

Consequently, the integrated server 16 of the electronic money management block 10 comes to retain the amount data equivalent to the amount of the electronic money entered in the IC card 50 (via cash deposits and via card-based deposits using a cash card or credit card).

In this way, the amount data (electronic money) the user desires is entered in the IC card 50 by various methods using cash or a cash card or credit card. Then the user can buy goods, etc. at stores using the IC card 50 containing the amount data.

Figure 12:
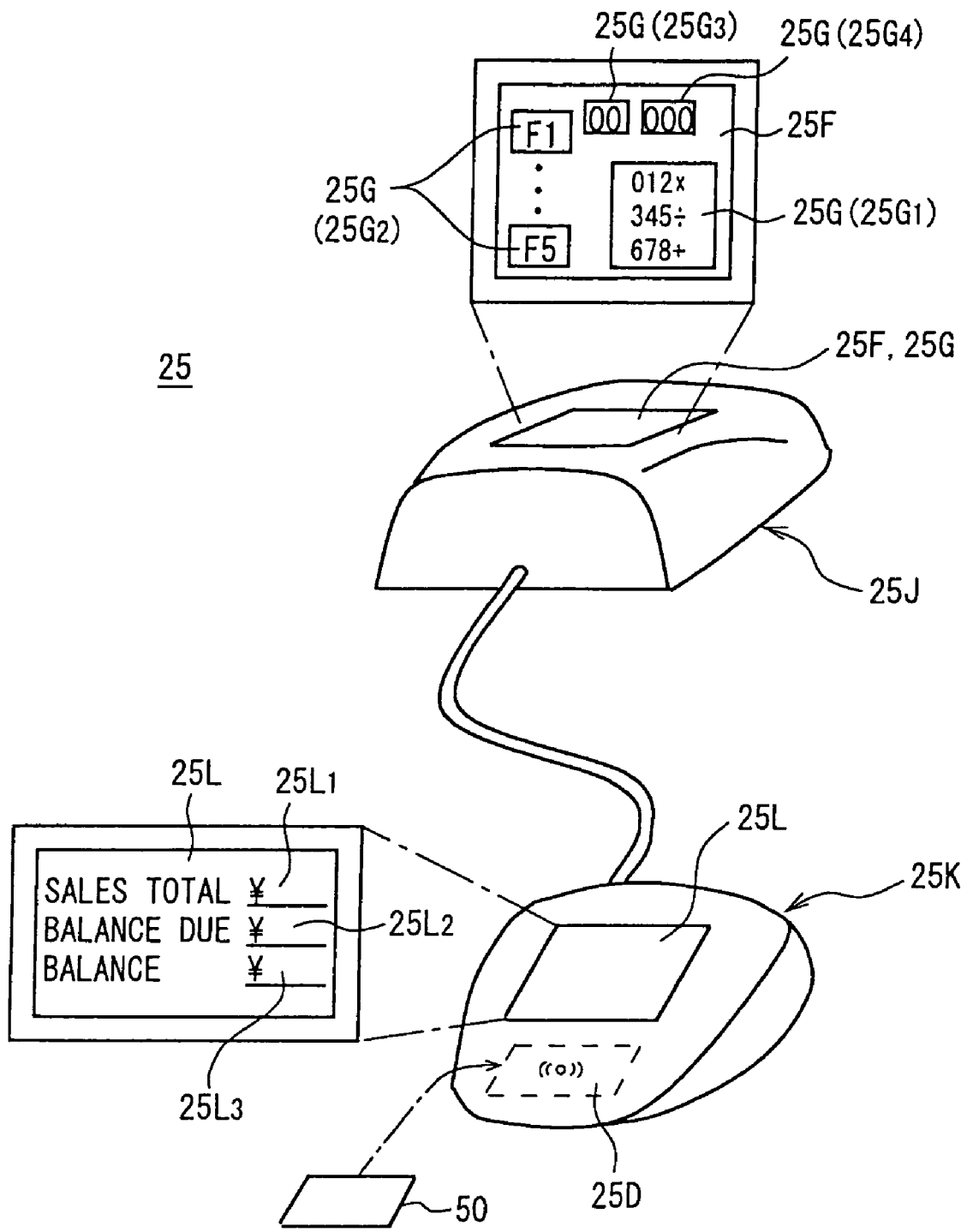
FIG. 12 is a perspective view showing the appearance of an electronic money terminal.

Stores are provided with an electronic money terminal $25_x$ ($25_1$ to $25_n$) connected with a POS (pointing on sale) resister. As shown in FIG. 12, the electronic money terminal $25_x$ comprises a main unit 25J operated by the clerk at the store where the electronic money terminal $25_x$ has been installed and an IC card read/write portion 25K that exchange data with the IC card 50 in a contactless manner when the user brings the IC card 50 close to that portion.

On the exterior of the main unit 25J is a touch panel that combines a display portion 25F and operating portion 25G which contains arithmetic keys $25G_1$, function keys $25G_2$, a 100-yen key $25G_3$, a 1000-yen key $25G_4$, etc. The function keys $25G_2$ allow the operator to preset the prices of frequently used commodities. Then the clerk operating the main unit 25J can easily enter the prices when multiple commodities are purchased, by entering, for example, "F1×3+F2×2" with function keys $25G_2$ and arithmetic keys $25G_1$. Incidentally, the 100-yen key $25G_3$ and 1000-yen key $25G_4$ are used by the clerk when entering the prices of commodities with numeric keys of the arithmetic keys $25G_1$.

The IC card read/write portion 25K comprises, on its exterior, a card communications portion 25D (with the same configuration and the loop antenna 62 and modulation/demodulation circuit 61 in FIG. 5) that exchanges data with the IC card 50 in a contactless manner and a display portion 25L that displays the content of transactions. The electronic money terminal $25_X$ has been designed to determine that the user has the intention to use his/her IC card 50 (i.e., intention of consumption) when the user holds it over (holds close to) the IC card read/write portion 25K of the electronic money terminal $25_X$.

The display portion 25L comprises a sales total display portion $25L_1$ that displays the sales total entered by the clerk from the operating portion 25G on the main unit 25J, balance due display portion $25L_2$ that displays the balance due if there is not sufficient balance in the IC card 50, and a balance display portion $25L_3$ that displays the electronic money remaining in the IC card 50 after a given use of the IC card 50.

Figure 13:
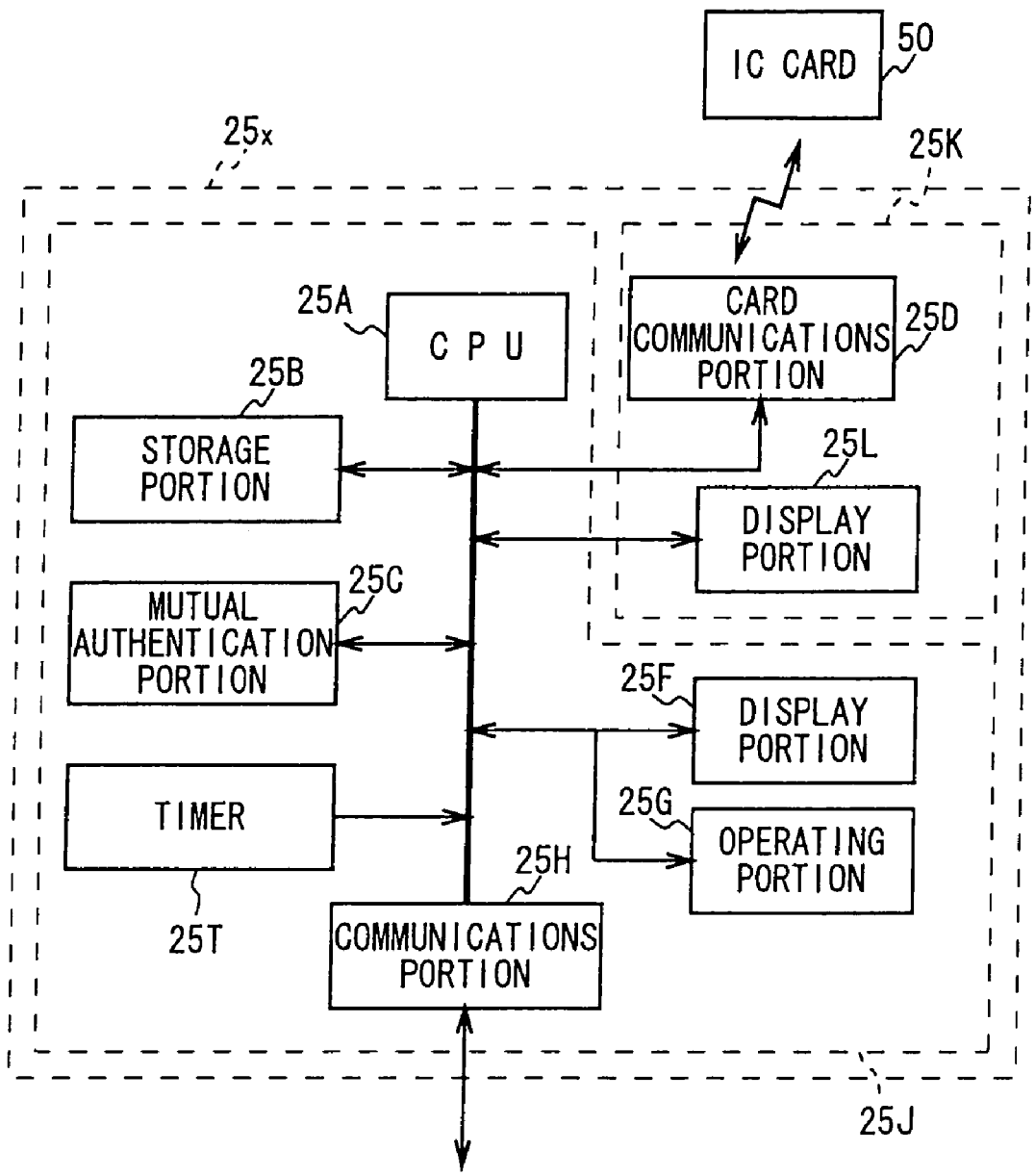
FIG. 13 is a block diagram showing the configuration of the electronic money terminal.
Figure 14:
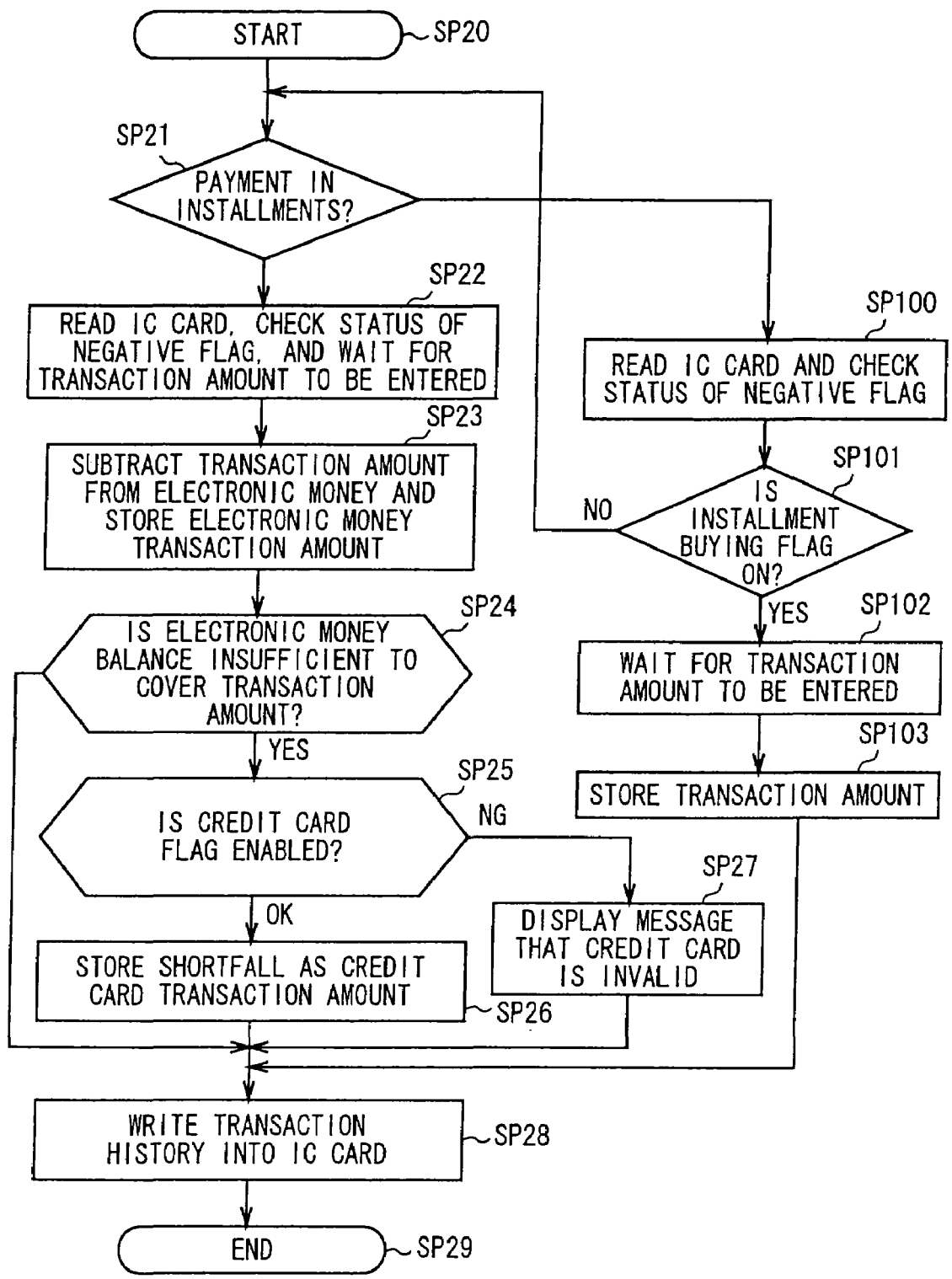
FIG. 14 is a flow chart showing an information card transaction procedure on the electronic money terminal.

As shown in FIG. 13, the CPU 25A of the electronic money terminal $25_x$ has been designed to perform the IC card transaction procedure shown in FIG. 14 according to a program stored in a storage portion 25B. As the user brings his/her IC card 50 close to the card communications portion 25D of the IC card read/write portion 25K and the clerk starts a transaction from the operating portion 25G of the main unit 25J, the CPU 25A enters the IC card transaction procedure in Step SP20 shown in FIG. 14 and then determines in Step SP21 whether the user wants to use payment in electronic money or payment in installments. That is, the clerk selects either an electronic money transaction or installment transaction by operating a Payment Method selection key, one of the function keys $25G_2$ on the operating portion 25G according to the payment method the user wants, and then the CPU 25A determines the payment method according to the clerk's selection.

If the specified payment method is payment in electronic money, the CPU 25A moves to Step SP22, reads out the card number and other information as well as past transaction history data from the IC card 50, and waits for the clerk to input the sales total from the operating portion 25G.

Incidentally, the CPU 25A has been designed to read from the IC card 50 whether the Negative flag D26 (FIG. 7B) is on, and to reject the IC card 50 if the flag is on. Details of the Negative flag D26 will be described later.

When the clerk enters the prices of commodities via the operating portion 25G, the CPU 25A goes to the next step SP23, subtracts the sales total from the balance data D22 (FIG. 7B) stored in the RAM 58 of the IC card 50, and stores the subtracted transaction amount of electronic money together with the card number and transaction date/time information of the IC card 50 in the electronic money transaction amount storage area in the storage portion 25B of the electronic money terminal $25_x$. Incidentally, the transaction date/time is detected by a timer $25_T$ installed in the main unit 25J.

If the spending is larger than the electronic money balance stored in the IC card 50, the CPU 25A displays the appropriate amounts in the display portion 25F and balance due display portion $25L_2$, moves from Step SP24 to Step SP25, and reads the Credit Card flag stored in the IC card 50 (FIG. 7B). If it is set to Enabled, the CPU 25A goes to Step SP26 and stores the shortfall as a credit card transaction amount in the credit card transaction amount storage area in the storage portion of the electronic money terminal $25_x$.

Consequently, the amount taken in from the balance in the IC card 50 is stored as electronic money transaction information together with the card number and transaction date/time information of the IC card 50 in the storage portion 25B of the electronic money terminal $25_x$ while the amount consumed as the credit card transaction amount is stored as credit card transaction information together with the card number and transaction date/time information of the IC card 50 in the storage portion 25B of the electronic money terminal $25_x$.

Incidentally, when the IC card 50 is supplied to the user, the card number of the available credit card issued by the card company used by the user and the card number of the IC card 50 supplied to the user are registered with the issue-data server 14 (FIG. 2) of the electronic money management block 10 and the Credit Card flag D24 (FIG. 7B) in the RAM 58 of the IC card 50 is set to Enabled. Using the card number of the credit card, the electronic money management block 10 checks the validity of the card periodically with the card company, based on the expiration date, any delay in payments, any reported theft or loss, etc.

If the check shows that the credit card is invalid, the electronic money management block 10 sends the card number of the IC card 50 possessed by the user under whose name the card number of the invalid credit card has been registered, together with a message that the credit card is invalid, to the electronic money terminal $25_x$ ($25_1$ to $25_n$) Consequently, when the IC card 50 is used, if the electronic money balance is insufficient, the electronic money terminal $25_x$ ($25_1$ to $25_n$) displays a message that the electronic money balance is insufficient on the display portions 25F and 25L instead of charging the shortfall to the credit card and sets the Credit Card flag in the memory of the IC card 50 to Disabled.

If the Credit Card flag in the memory of the IC card 50 is changed to Disabled, the electronic money terminals $25_x$ ($25_1$ to $25_n$) consume only the electronic money deposited beforehand in the IC card 50. Therefore, the CPU 25A of the electronic money terminal 25 moves from Step SP25 to Step SP27 in FIG. 14 and displays a message that the credit card is invalid on the display portions 25F and 25L.

On the other hand, if payment in installments is selected in Step SP21 in FIG. 13, the CPU 25A goes to Step SP100, reads out the card number and other information as well as past transaction history data from the IC card 50, and checks the status of the Negative flag D26. If the Negative flag D26 is on, the given IC card 50 is rejected. If the Negative flag D26 is off, the CPU 25A goes to Step SP101 that follows SP100 and checks the Installment Buying flag D27 described above with reference to FIG. 7B. If the Installment Buying flag D27 is off, the CPU 25A displays information to the effect that no installment buying has been registered on the display portion 25F, returns to Step SP21 described above, and waits again for a payment method to be entered again.

Incidentally, when the IC card 50 is supplied to the user, if the user wants an installment transaction, the issue-data server 14 (FIG. 2) of the electronic money management block 10 registers the card number of the given IC card 50 for installment buying in the database 16C of the integrated server 16.

Therefore, if the Installment Buying flag D27 for the IC card 50 is on, the CPU 25A goes to Step SP102 and waits for the clerk to enter a transaction amount. When the clerk enters the prices of commodities via the operating portion 25G, the CPU 25A goes to Step SP103 that follows SP102 and stores the sales total as the amount to be paid in installments together with the card number and transaction date/time information of the IC card 50 in the installment amount storage area in the storage portion 25B of the electronic money terminal $25_x$.

Consequently, the amount to be paid in installments is stored as installment transaction information together with the card number and transaction date/time information of the IC card 50 in the storage portion 25B of the electronic money terminal $25_x$. In this case, the storage portion 25B operates as first accumulating means.

Incidentally, when an installment transaction is used, the CPU 25A of the electronic money terminal $25_x$ naturally does not update the balance data D22 (FIG. 7B) stored in the RAM 58 of the IC card 50.

When the sequence of processes for the IC card 50 transaction is complete, the CPU 25A of the electronic money terminal 25 goes to Step SP28, writes the transaction history into the RAM 58 of the IC card 50 as electronic money log data D23 (FIG. 7B), and finishes the IC card transaction procedure in Step SP29.

Consequently, the storage portion 25B of the electronic money terminal 25 keeps records of the transaction amount charged to the electronic money deposited in the IC card 50 in advance and the transaction amount charged to the credit card in case of insufficient electronic money separately as the transaction history of the IC card 50. Incidentally, the storage portion 25B stores the transaction dates/times and IC card number together with the transaction amounts as transaction history data.

Regarding the electronic money log data D23 (FIG. 7B) written into the RAM 58 of the IC card 50, 32-byte data consisting of 12 items, for example, constitutes one transaction history data block as shown in FIG. 15A and the past 15 transaction history data blocks (15 times of use) are written cyclically.

The transaction history data block contains Card Transaction information $D23_1$ for identifying the communication data written into the block on the side of the IC card 50, Log Type information $D23_2$ that represents the use form (use form such as deposit or consumption; distinction between whether a payment is covered by the electronic money balance, totally or partially by a credit card, or by installments) of electronic money in this transaction history, Date/Time information $D23_3$, Terminal Number information $D23_4$ for identifying the electronic money terminal $25_x$ used, Dealing Value (transaction amount) information $D23_5$ in this transaction history, Key Version information $D23_6$ that represents the version of the encryption key used for the communication data exchanged in the IC card transaction, Balance Data information $D23_7$ that represents the electronic money balance remaining in the IC card after the transaction (use), Terminal Transaction information $D23_8$ for use by the electronic money terminal $25_x$ to identify the communication for this transaction (use) between the electronic money terminal $25_x$ and IC card 50, and Signature information $D23_9$ prepared using the key specified by the Key Version information $D23_6$ described above.

In this way, the control portion 59 of the IC card 50 has been designed to form the electronic money log data D23 consisting of one transaction history block (FIG. 15A) for each transaction. Regarding the transaction unit in this case, the transaction charged to the electronic money deposited in the IC card 50 in advance and the transaction charged to the credit card in case of insufficiency in the electronic money are treated as separate units (transaction histories) and a separate transaction history block is formed for each transaction unit.

The electronic money log data D23 prepared each time the IC card 50 is used, is accumulated in the storage portion 25B of the electronic money terminal $25_x$ in Steps SP23, SP26 and SP 103 of the IC card transaction procedure described above with reference to FIG. 14 as well as written into the RAM 58 of the IC card 50 in Step SP28 described above with reference to FIG. 14.

The CPU 25A of the electronic money terminal 25 writes card identification information D23A, shown in FIG. 15B, for identifying the IC card 50 into the storage portion 25B, attaching it to the electronic money log data D23 (FIG. 15A).

The card identification information D23A contains Card IDm $D23A_1$ that represents the IC card used in the electronic money log data D23 to which the card identification information 23A is attached, Terminal Transaction Flag $D23A_2$ that indicates whether the electronic money terminal $25_x$ into which the electronic money log data D23 is written is identical to the electronic money terminal $25_x$ where the electronic money log data D23 was prepared when the card was used, Key Version information $D23A_3$ that represents the version of the encryption key for the communication data used when this electronic money log data D23 is written into the electronic money terminal $25_x$, and Signature information $D23A_4$ prepared using the key specified by the Key Version information $D23A_3$.

Incidentally, at the time of the card use when this electronic money log data D23 is prepared, the CPU 25A of the electronic money terminal $25_x$ writes the electronic money log data D23 into the RAM 58 of the IC card 50 as well as writes it into the storage portion 25B of the electronic money terminal $25_x$ by attaching to it the card identification information D23A. The IC card 50 contains electronic money log data D23 for the past 15 uses. Each time the IC card 50 is used anew, electronic money log data D23 is written together with the card identification information D23A into the electronic money terminal $25_x$ where this IC card 50 is used.

Thus, the electronic money terminal $25_x$ has been designed to write the electronic money log data D23 of the past 15 uses into the storage portion 25B from the IC card 50 each time the IC card 50 is used. If the Terminal Number information $D23_4$ contained in the past electronic money log data D23 to be written turns out to be information that represents another electronic money terminal $25_x$, the Terminal Transaction Flag $D23A_2$ of the card identification information D23A indicates that the electronic money log data D23 represents a transaction made on another electronic money terminal $25_x$. This indication is used for account settlement in the electronic money management block 10.

Figure 16:
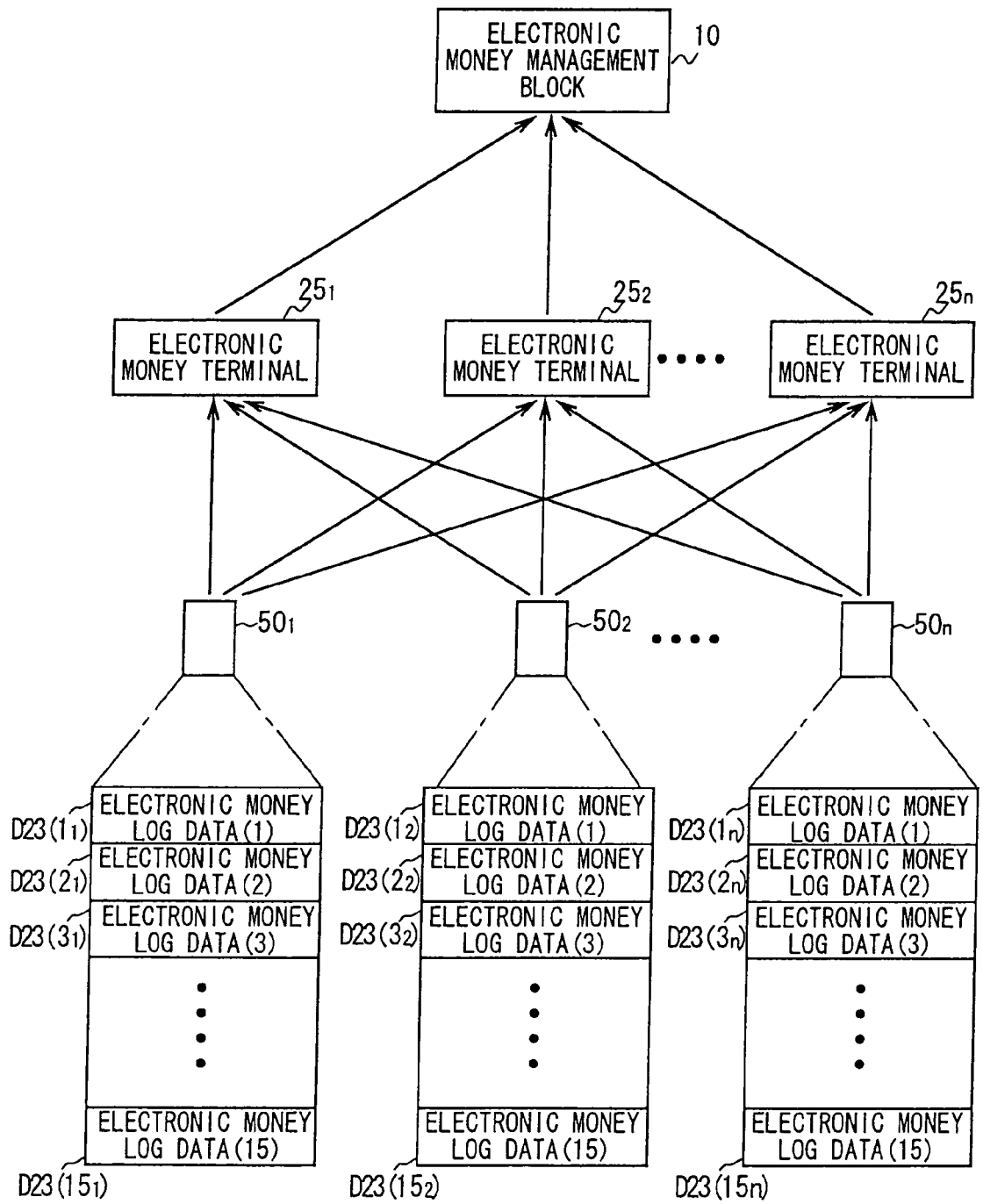
FIG. 16 is a schematic block diagram showing the flow of electronic money log data.

Incidentally, as shown in FIG. 16, since the electronic money log data $D23(1_1)$ to $D23(15_1)$, $D23(1_2)$ to $D23(15_2)$, $D23(1_n)$ to $D23(15_n)$ of the past 15 uses stored in each IC card 50 ($50_1$, $50_2$, . . . $50_n$) are written into the electronic money terminal $25_x$ each time the IC card 50 ($50_1$, $50_2$, . . . $50_n$) is used, if the same IC card 50 is used on the same electronic money terminal $25_x$ multiple times, the same electronic money log data D23 may be written into this electronic money terminal $25_x$ multiple times. In that case, however, the CPU 25A of the electronic money terminal 25 discards the redundant electronic money log data D23, based on the Card Transaction S/N (A) information $D23_1$ in the electronic money log data D23 shown in FIG. 15.

Consequently, when IC cards 50 ($50_1$, $50_2$, . . . $50_n$) are used, one electronic money terminal $25_x$ stores, without redundancy, the electronic money log data D23 read from these IC cards 50 ($50_1$, $50_2$, . . . $50_n$) in the past 15 uses and new electronic money log data D23 generated this time.

Under this condition, the same electronic money log data D23 of each IC card 50 ($50_1$, $50_2$, . . . $50_n$) are stored in a plurality of electronic money terminals $25_x$ ($25_1$, $50_2$, . . . $25_n$). However, of the same electronic money log data D23 stored scatteringly in these electronic money terminals $25_x$, the electronic money log data D23 stored in the electronic money terminal $25_x$ used for the transaction (use of the IC card) that produced this electronic money log data D23 is flagged with the Terminal Transaction Flag $D23A_2$ (FIG. 15B) of card identification information D23A (FIG. 15B) stored together with the electronic money log data D23. Of the electronic money log data D23 gathered in the electronic money management block 10, only the electronic money log data D23 whose Terminal Transaction Flag has been set are used for account settlement.

Thus, each electronic money terminal $25_x$ stores the amount, card number, and date/time information for each use of an IC card 50 as transaction history (electronic money log data D23) and the electronic money management block 10 captures, once a day, the transaction histories of the IC cards 50 stored in the electronic money terminals $25_x$ ($25_1$ to $25_n$).

Of the IC-card transaction history information (electronic money log data D23 and card identification information D23A) captured from the electronic money terminals $25_x$ ($25_1$ to $25_n$), the electronic money management block 10 totals the credit-card transaction information of each IC card 50 at regular intervals and sends the results together with the card number of the IC card 50 to the management computer 100 at the bank or credit company, based on the credit card number registered in advance.

Then the management computer at the bank or credit company debits the amount charged to the credit card from the user's account, sends it to the electronic money management block 10, and thereby accumulates it in the integrated server 16.

Therefore, the amounts accumulated as the transaction amount of the credit card in case of an insufficient electronic money balance when the user uses his/her credit card 50 are debited collectively from the user's account by the management computer 100 at the bank or credit company and stored in the integrated server 16 of the electronic money management block 10.

In this way, if the electronic money balance is insufficient when the user uses his/her IC card 50, by debiting the amounts charged to a credit card collectively later instead of making the management computer 100 a the bank or credit company debit the amount at once, the electronic money management block 10 can ask the management computer 100 at the bank or credit company to debit the amount for a plurality of transactions in one common exchange. Since the use of the IC card 50 does not incur communications costs each time, the IC card 50 (credit card) can be used even for a small transaction amount.

The electronic money management block 10 settles accounts, for example, once a month, based on the transaction histories (electronic money log data D23 and card identification information D23A) of the IC cards 50 captured collectively into the database 16C of the integrated server 16 from the electronic money terminals 25 ($25_1$ to $25_n$) once a day.

Figure 17:
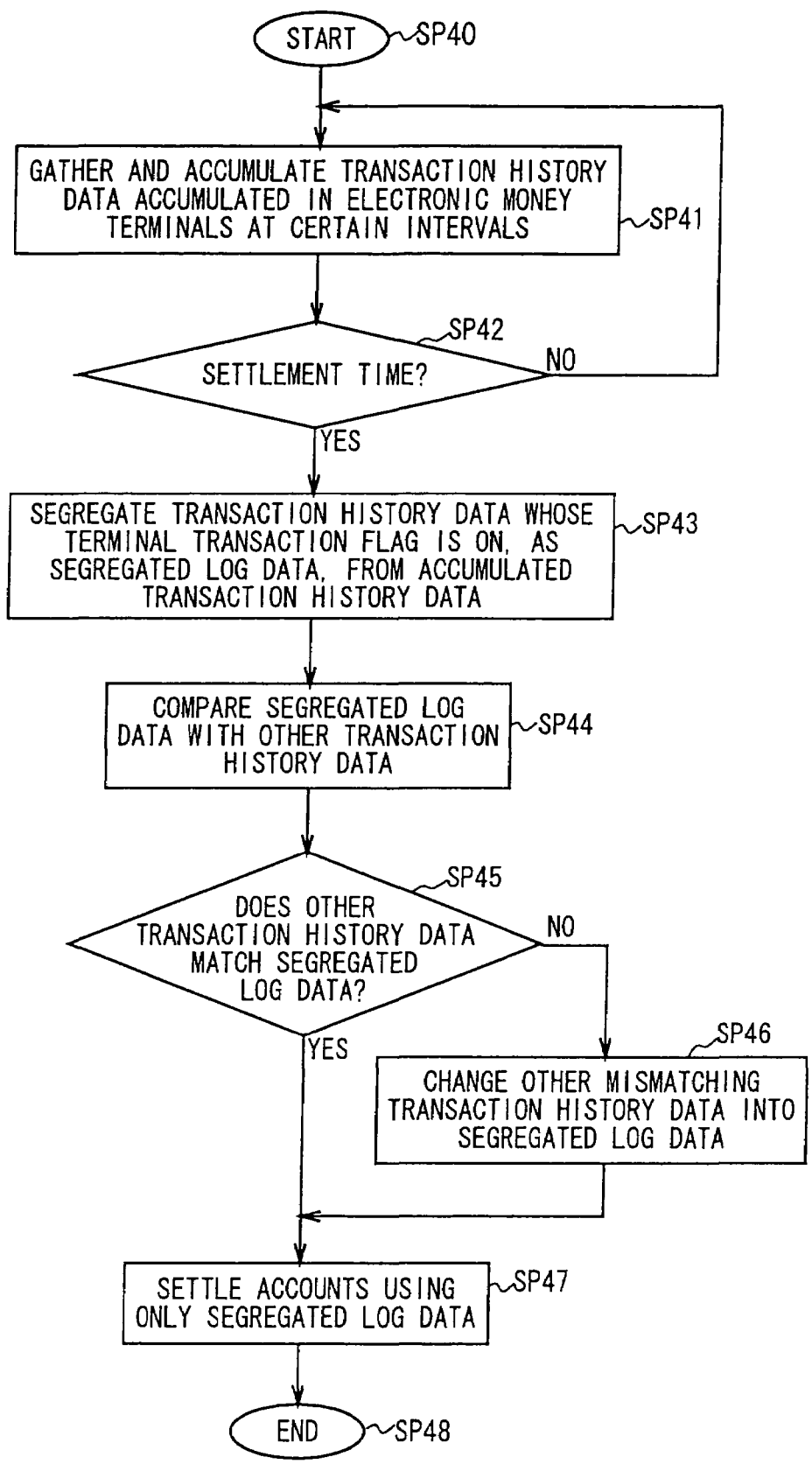
FIG. 17 is a flow chart showing the segregating procedure of log data.

FIG. 17 shows the procedure in which the electronic money server 13 of the electronic money management block 10 gathers the combination (transaction histories) of electronic money log data D23 (FIG. 15A) and card identification information D23A (FIG. 15B) into the integrated server 16 from the electronic money terminals $25_x$ periodically (once a day, for example) and settles accounts using the transaction histories accumulated in the integrated server 16. The electronic money server 13 starts this procedure in Step SP40 and gathers the transaction histories accumulated in the electronic money terminals $25_x$ and stores them in the integrated server 16, for example, once a day in Step SP41.

In Step SP42, the electronic money server 13 determines whether now is a settlement time that occurs, for example, once a month. If it is a settlement time, the electronic money server 13 goes to Step SP43 and segregates the transaction histories whose Terminal Transaction Flag $D23A_2$ is on, as segregated log data, from the transaction histories accumulated in the integrated server 16.

Then, the electronic money server 13 goes to Step SP44 and compares the segregated log data with other transaction history data. If the comparison results in a mismatch, it means that the electronic money log data D23 generated when an IC card 50 was used has been lost in any of the electronic money terminals $25_x$. Then the electronic money server 13 gets a negative answer in Step SP45 and goes to Step SP46.

In Step SP46, the electronic money server 13 changes the other transaction history data that does not match the segregated log data into segregated log data. Consequently, the lost electronic money log data D23 is substituted by the electronic money log data D23 read out from this IC card 50 when the IC card 50 was used on other electronic money terminals $25_x$.

Thus, the electronic money server 13 settles account using only segregated log data in Step SP47 and finishes the procedure in Step SP48.

Figure 18:
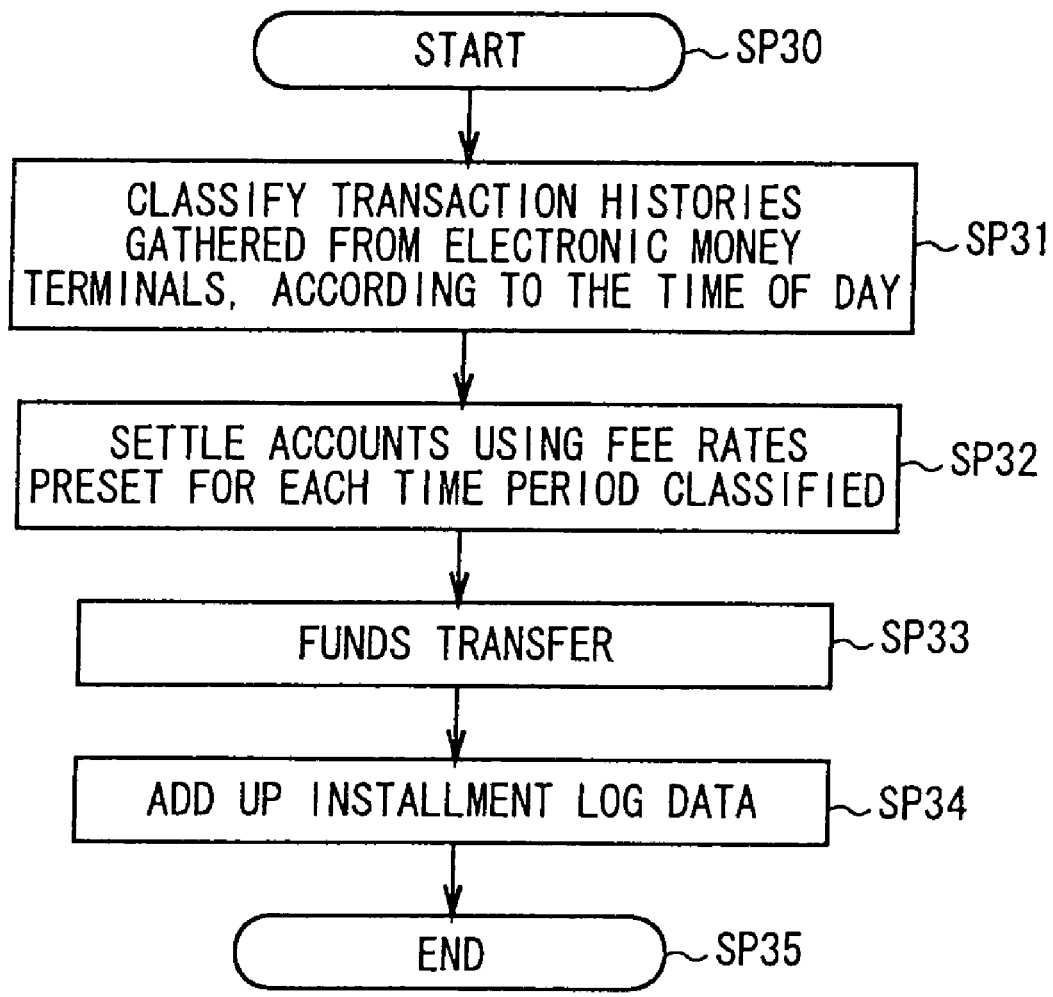
FIG. 18 is a flow chart showing the account settlement procedure by the electronic money management block.

The electronic money server 13 starts the account settlement steps shown in FIG. 18 following the Process Start instruction from the integrated server 16. In Step SP30, it starts the account settlement procedure, and in Step SP31, it classifies the transaction histories (electronic money log data D23 and card identification information D23A) gathered from the electronic money terminals, according to the time of day based on the Date/Time information $D23_3$ (FIG. 15A). Incidentally, the database 16C of the integrated server 16 stores the usage fees of the electronic money system 1 at each store: the ratios of the usage fees to sales totals have been set differently depending on the time of day. In this embodiment, the fee rate for the use of the IC card 50 during the period from 5 a.m. to 5 p.m. (first time period) has been set at 5% and the fee rate during the period from 5 p.m. to 5 a.m. (second time period) has been set at 7%.

Therefore, in Step SP32, the electronic money server 13 settles accounts for the electronic money log data D23 classified into the first and second time periods in Step SP31 of FIG. 16, using the fee rates for each time period.

That is, the electronic money server 13 settles accounts for the transactions conducted during the first time period using the usage fee rate of 5% and settles accounts for the transactions conducted during the second time period using the usage fee rate of 7%.

Thus, the 5% usage fee rate is deducted from the amounts of the transactions conducted during the first time period and the 7% usage fee rate is deducted from the amounts of the transactions conducted during the second time period, and the resulting amount is received by the given store. After settling accounts in this way, the electronic money server 13 goes to Step SP33 where it transfers the amounts corresponding to the results of the account settlements to the accounts of individual stores from the amount data accumulated in the database 16C of the integrated server 16. In so doing, the electronic money server 13 outputs details of the transfer for each store, i.e., a detailed statement and total amounts classified by the time period and sends them to each store.

By varying the usage fee rate of electronic money with the time period in this way, it is possible to set a low fee rate during daytime hours when relatively inexpensive commodities sell well and set a high fee rate during nighttime hours when relatively expensive commodities sell well, and thus realize fee rates according to the pricing of commodities at each store.

Then, the electronic money server 13 goes to Step SP34 where it adds the installment transaction data out of the electronic money log data D23 used for the account settlement process to the registration list of installment payments registered beforehand in the database 16C of the integrated server 16 according to card numbers and totals the installment balance and calculates the interests for each IC card 50. It finishes the account settlement process in Step SP35.

Incidentally, the installment balance totaled for each IC card 50 is added to the past installment balance for the IC card 50 contained in the registration list of installment payments in the database 16C of the integrated server 16 and the result is saved together with its interests as a new balance. Then each time the user makes a payment via a deposit terminal $21_x$ (FIGS. 8 and 9), the amount equivalent to the payment is deducted from the balance. In this case, the database 16C of the integrated server 16 operates as second accumulating means while the CPU 16A operates as balance management means.

Figure 19:
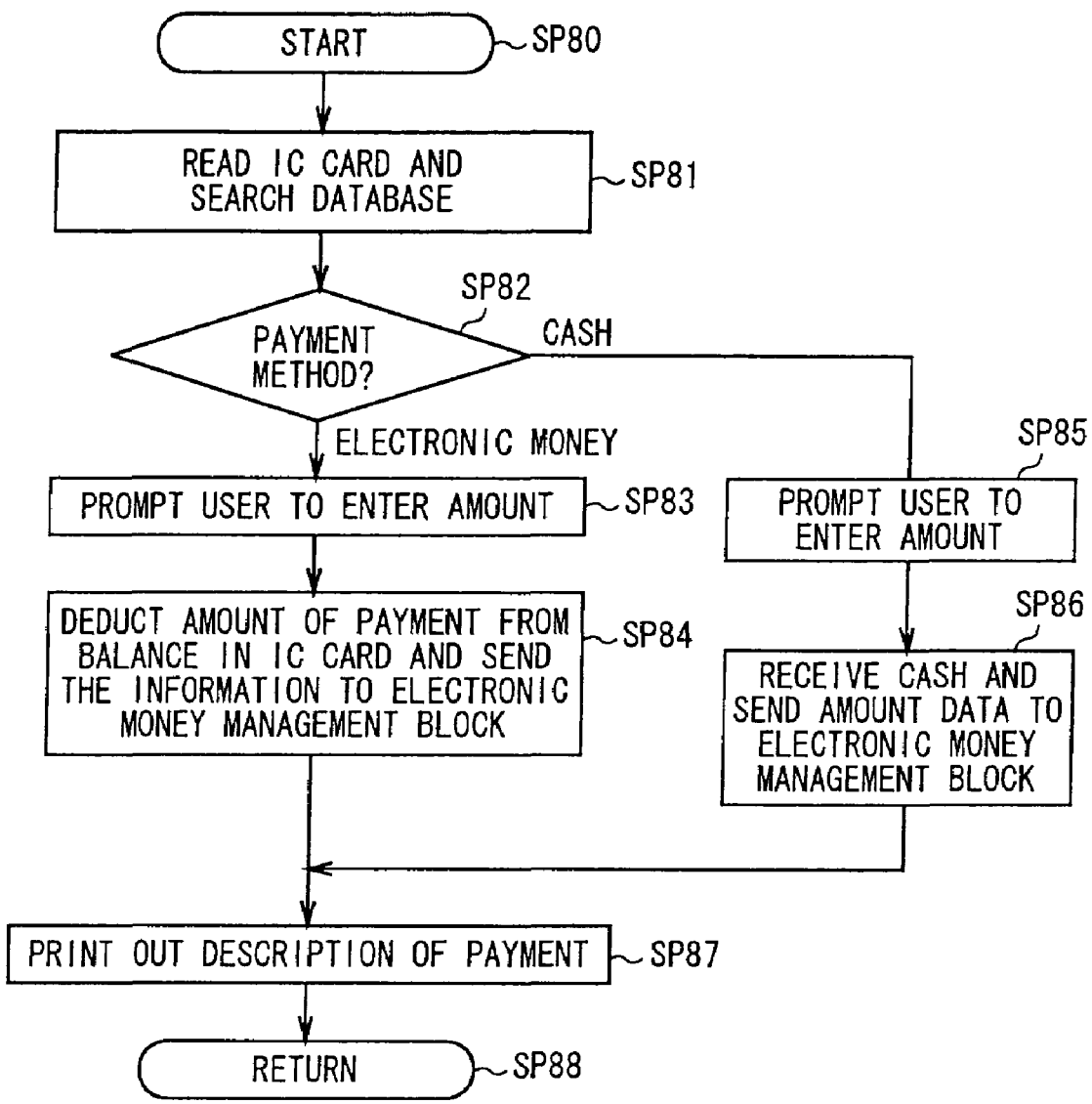
FIG. 19 is a flow chart showing the procedure for receiving a payment.

When the user pays remaining installments from a deposit terminal $21_x$, the deposit terminal $21_x$ receives the user's payment in Step SP80 described above with reference to FIG. 10. In this process of receiving the payment, the CPU 21A of the deposit terminal $21_x$ moves from Step SP80 to Step SP81 in FIG. 19, where it reads the card number from the IC card 50 and receives the installment balance corresponding to this IC card from the database 16C of the integrated server 16. Here, the CPU 16A of the integrated server 16 has been designed to calculate, for example, 15% of the installment balance as the minimum amount of payment and send the minimum payment information together with the installment balance to the deposit terminal $21_x$. The integrated server 16 that calculates the minimum amount of payment and the deposit terminal $21_x$ compose payment receiving means.

Figure 20:
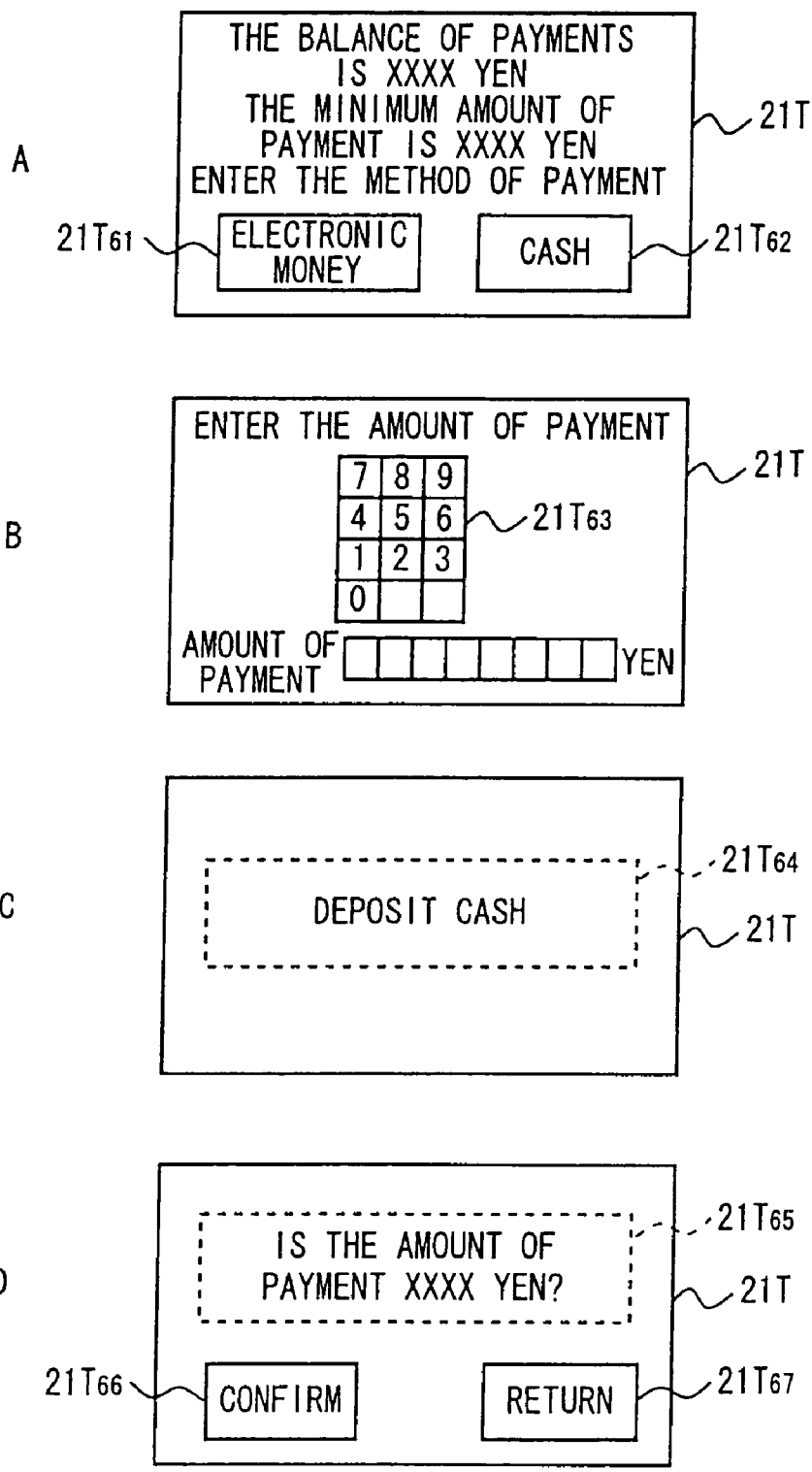
FIG. 20 is a schematic view showing a display example on the deposit terminal.

In Step SP82, the CPU 21A displays the payment method selection screen shown in FIG. 20A together with the installment balance and the minimum amount of payment on the touch panel 21T of the deposit terminal $21_x$. The user selects a payment method by pressing an Electronic Money key $21T_61$ or Cash key $21T_62$.

If the user selects payment in electronic money, the CPU 21A moves from Step SP82 to Step SP83 where it displays numeric keys $21T_63$ such as those shown in FIG. 20B on the touch panel 21T to prompt the user to enter the amount of payment. As the user enters a desired amount of payment by operating the numeric keys $21T_63$, the CPU 21A goes to Step SP84 where it deducts the amount of payment entered by the user from the electronic money balance written into the RAM 58 of the IC card 50 and informs the integrated server 16 in the electronic money management block 10 about the deduction. The CPU 16A of the integrated server 16 subtracts the deducted amount, as the amount of payment, from the installment balance registered in the database 16C. Also, the control portion 59 of the IC card 50 updates the balance data D22 (FIG. 7A) stored in the RAM 58.

On the other hand, if the user selects payment by cash in Step SP82, the CPU 21A goes to Step SP85 where it displays the message 21T$_6$4 shown in FIG. 20C on the touch panel 21T prompting the user to deposit cash. When the user deposits the desired amount of cash in the cash deposit portion 21J, the CPU 21A calculates the deposited cash and displays the result as a confirmation display 21T$_{65}$ such as the one shown in FIG. 20D on the touch panel 21T.

At the same time, the CPU 21A displays a Confirm key 21T$_{66}$ and Return key 21T$_{67}$ on the touch panel 21T. If the user deposited a wrong amount, he/she presses the Return key 21T$_{67}$ and then the CPU 21A returns the cash to the cash deposit portion 21J and finishes this process. If the user deposited the correct amount, he/she presses the Confirm key 21T$_6$6 and then the CPU 21A sends data about the amount paid, to the integrated server 16 of the electronic money management block 10. The CPU 16A of the integrated server 16 subtracts the data about the amount paid from the installment balance registered in the database 16C.

Then the CPU 21A goes to Step SP87 where it prints a description of payment which shows the amount paid by the user this time, outputs it from the receipt output portion 21I (FIG. 8), finishes this payment processing, and finishes the deposit/payment processing in Step SP19 of FIG. 10.

In this way, by paying a desired amount not less than the minimum amount of payment through a deposit terminal 21$_x$, for example, once a month on a fixed day (pay day of installments), the user can pay the amount that suits the occasion instead of deciding the amount of each installment in advance.

Now the processing by the electronic money system 1 in case a user loses his/her IC card 50 will be described.

Any user who loses his/her IC card 50 files a lost-card report to the electronic money management block 10 (electronic money management means, card loss handling means). Upon receiving the lost-card report, the operator of the electronic money management block 10 identifies the lost IC card by the card number by operating the operating portion 16D consisting of, for example, a keyboard on the integrated server 16 (balance confirmation means) shown in FIG. 4.

The CPU 16A registers the card number of the lost card in the database 16C through the operating portion 16D. In this embodiment, the CPU 16A of the integrated server 16 always runs the card loss handling procedure shown in FIG. 21. After starting this procedure in Step SP50, the CPU 16A determines in Step SP51 whether any lost-card report has been filed (entered).

If the answer is negative, which means that no lost-card report has been filed, the CPU 16A goes to Step SP52 where it determines whether it is time to gather electronic money log data (transaction history data) D23 from the electronic money terminals 25$_x$ (25$_1$ to 25$_n$) Incidentally, according to this embodiment, the integrated server 16 has been designed to store the electronic money log data D23 gathered from the electronic money terminals 25$_x$ (25$_1$ to 25$_n$) once a day in the database 16C under the control of the electronic money server 13.

Therefore, the CPU 16A repeats Steps SP51 and SP52 until it is time to gather electronic money log data D23. When it is time to gather electronic money log data D23, CPU 16A gets a positive answer in Step SP52. Consequently, it goes to Step SP53 and stores, in the database 16C, one day of electronic money log data D23 that has been collected from the electronic money terminals 25$_x$ (25$_1$ to 25$_n$) by the electronic money server 13 and stored in the electronic money terminals 25$_x$. The process of Step SP53 is the same as the process of Step SP41 described above with reference to FIG. 17.

In Step SP54, the CPU 16A determines whether a lost-card report was filed before the collection of electronic money log data D23 in Step SP53 described above (i.e., in the last one day before the collection of electronic money log data D23 in Step SP53).

If the answer is negative, which means that no lost-card report has been filed and that there is no need to run a card loss handling process, the CPU 16A repeats the process starting with Step SP51.

If the answer in Step SP51 is positive, which means that there has been a lost-card report, the CPU 16A goes to Step SP58 and sends a command to create a negative list of the lost card for stopping the use of the lost card based on the card number of the IC card 50 whose loss has been reported (hereafter referred to as a lost card) as well as an instruction to disable the lost card against any attempt to use the lost card (described later), to the electronic money terminals 25$_x$ (25$_1$ to 25$_n$). Thus, as soon as a lost-card report is filed, the integrated server 16 can stop the handling of the lost card by sending a command to register the lost card in the negative list and instruction to disable the lost card to the electronic money terminals 25$_x$.

Figures 22, 23:
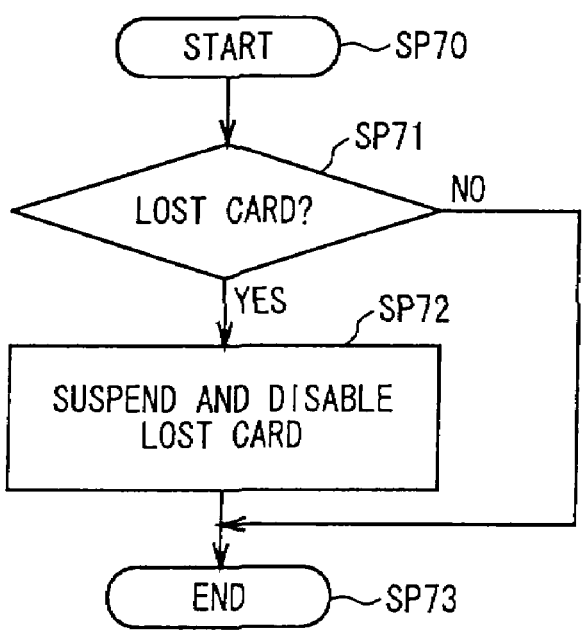
FIG. 22 is a schematic view showing the content of negative list data.
FIG. 23 is a flow chart showing the procedures for suspending and disabling a lost card on the electronic money terminal.

Incidentally, when the integrated server 16 sends a command to create a negative list of the lost card to the electronic money terminals 25$_x$ (25$_1$ to 25$_n$), the CPU 25A of each electronic money terminal 25$_x$ (25$_1$ to 25$_n$) creates a negative list of the lost card D58 as shown in FIG. 22 and stores it in the storage portion 25B. A negative list D58 is created for each lost card. It contains List Type information D58$_1$ which identifies this list as a negative list, Date (registered) information D58$_2$ which indicates the date when this negative list D58 was created, Date (start) information D58$_3$ which indicates the date when the use of the lost card was suspended by the negative list D58, Date (end) information D58$_4$ which indicates the date when the suspension is lifted, Card IDm information D58$_5$ which represents the card number of the lost card suspended by the negative list D58, Signature Key Version information D58$_6$ which indicates the version of the encryption key for this negative list D58, and Signature information D58$_7$ prepared using the key specified by the Key Version information D586.

Each electronic money terminal 25$_x$ (25$_1$ to 25$_n$) creates a negative list as shown in FIG. 22 for each lost card, so that in case of any attempt to use an IC card 59, it can determine whether the IC card 50 is a lost card by comparing the IC card number D11 (FIG. 7A) in the RAM 58 of the presented IC card 50 with the Card IDm information D58$_5$ in the negative list D58. The processing for the use of IC cards will be described later.

When the process of Step SP58 is complete, the CPU 16A returns to Step SP51 described above where it determines whether there is a new lost-card report. Each time a new lost-card report is filed, the CPU 16A performs Step SP58 described above, based on the card number of the lost card reported.

Thus, as a lost-card report is filed during the interval between the times when electronic money log data D23 is gathered from the electronic money terminals 25$_x$ once a day, the integrated server 16 determines the balance in the lost card when the electronic money log data D23 of the lost card is gathered from the electronic money terminals $25_x$ for the first time after the loss of the card was reported. If the CPU 16A of the integrated server 16 gets an affirmative answer in Step SP54, it goes to Step SP55.

In the balance determination process of Step SP55, the CPU 16A gathers the electronic money log data D23 of the lost card reported, based on the card number, out of the transaction histories (electronic money log data D23) of all IC cards 50 gathered from the electronic money terminals $25_x$, and determines the balance using the gathered electronic money log data D23 of the lost card.

The CPU 16A determines the electronic money balance, based on the Balance Data information $D23_7$ that represents the electronic money balance and that is contained in the latest electronic money log data D23, among the electronic money log data D23 described above with reference to FIG. 15A.

When the balance in the lost card is determined in this way, the CPU 16A goes to Step SP56 where it generates data to return the determined balance to the user, instructs the issue-data server 14 to reissue a card, and issues a new IC card 50 in place of the lost card on the issuing device 15. The reissued IC card 50 is assigned a card number different from the card number of the lost card. This enables the use of the reissued IC card 50 on the electronic money terminals $25_x$ that has suspended the use of the IC card 50 with the card number of the lost card.

Thus, after finishing the process of Step SP56, the CPU 16A of the integrated server 16 finishes the card loss handling procedure in Step SP57.

Figure 21:
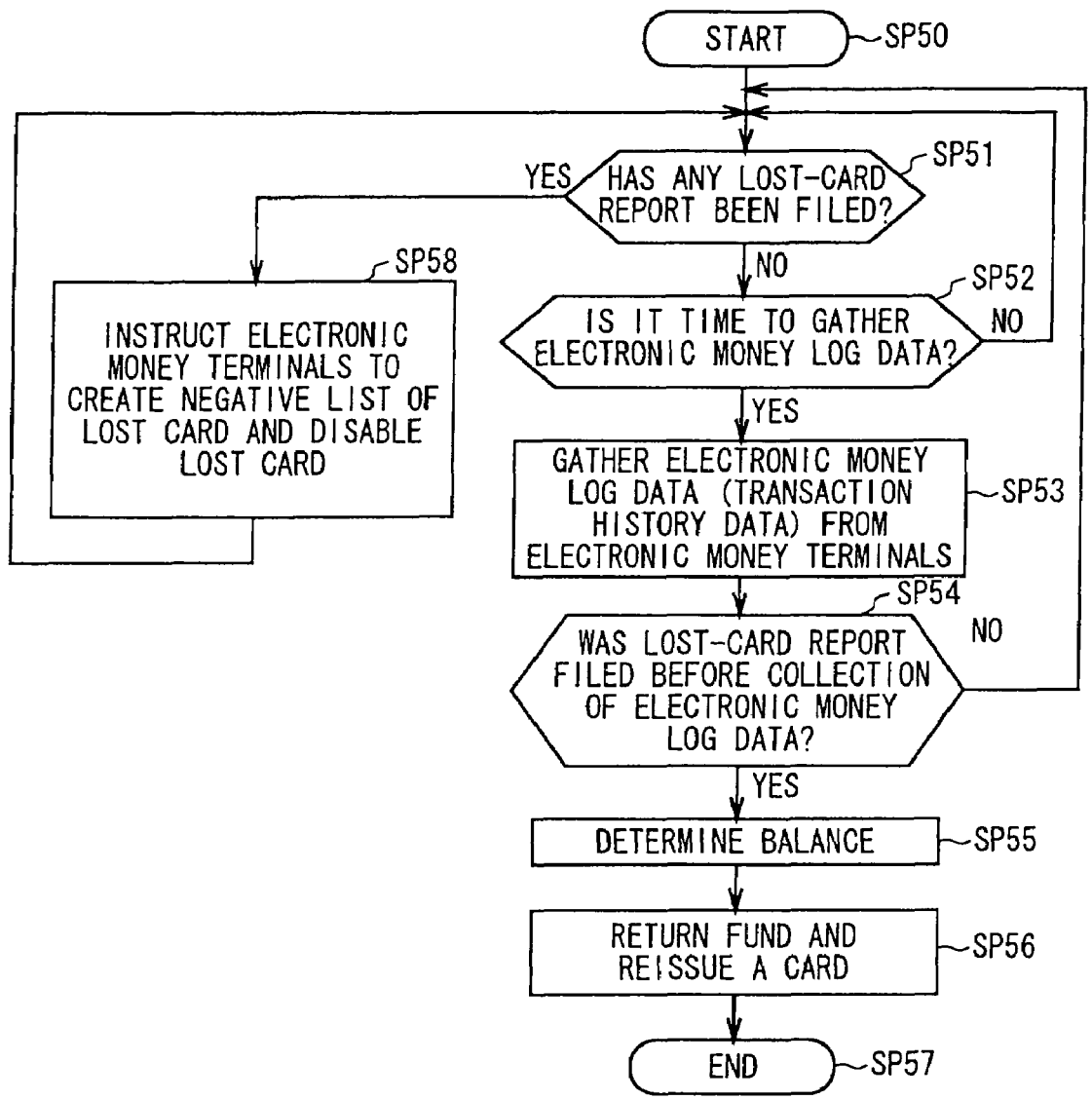
FIG. 21 is a flow chart showing the card loss handling procedure on the integrated server.

When the integrated server 16 sends a command to suspend the use of the lost card and instruction to create a negative list of the lost card to the electronic money terminals $25_x$ in Step SP58 of the card loss handling procedure in FIG. 21, the electronic money terminals $25_x$ additionally perform the processes for suspending and disabling the lost card as shown in FIG. 23 in the process of Step SP21 in FIG. 14 which is performed each time an IC card 50 is used.

In other words, upon receiving the commands to create a negative list of the lost card and disable the lost card from the electronic money management block 10, the CPU 25A of each electronic money terminal $25_x$ ($25_1$ to $25_n$) creates a negative list D58 (FIG. 22) of the lost card and stores it in the storage portion 25B. Then, starting from the day (normally the day when the negative list D58 was created) specified by the Date (start) information $D58_3$ (FIG. 22) in the negative list D58, each time the card number is read from this IC card 50 (Step SP21 in FIG. 14), the procedure for suspending and disabling a lost card is performed for this card number starting with Step SP70 in FIG. 23. In Step SP71, the CPU 25A of each electronic money terminal $25_x$ ($25_1$ to $25_n$) checks whether the card number of the given IC card 50 matches the card number (Card IDm information $D58_5$) of any lost card registered as a negative list D58 in the storage portion 25B.

If the answer is negative, which means that the given IC card 50 is not a lost card, the CPU 25A goes to Step SP73 to finish the procedure for suspending and disabling the lost card and then returns to Step SP21 described with reference to FIG. 14 to continue the IC card 50 transaction procedure.

On the other hand, if the answer in Step SP71 is affirmative, which means that the given IC card 50 is a lost card, the CPU 25A goes to Step SP72 where it suspends the handling of this card 50 (lost card) and registers this card 50 (lost card) as disabled.

Registration of a card as disabled is the process of disabling a lost card by setting the Negative flag D26 (FIG. 7B) on the management information D10 (FIG. 7) stored in the RAM 58 (FIG. 6) of the lost card. When the Negative flag D26 is set on the management information D10 of an IC card 50 (lost card), if a third party tries to use this IC card 50 (lost card) on an electronic money terminal $25_x$ ($25_1$ to $25_n$) the electronic money terminal $25_x$ ($25_1$ to $25_n$) identifies the lost card by checking the Negative flag D26 as described above in relation to Step SP21 in FIG. 14 and disables the IC card 50.

When a lost-card report is filed, a negative list is created on each electronic money terminal $25_x$ ($25_1$ to $25_n$), thereby causing every electronic money terminal $25_x$ ($25_1$ to $25_n$) to stop handling the lost card. Also, if an attempt to use the lost card is made on any electronic money terminal $25_x$ ($25_1$ to $25_n$), the electronic money terminal $25_x$ can disable the lost card itself by setting the Negative flag D26 on the lost card itself. Thus, by disabling the lost card on both electronic money terminal $25_x$ and lost card itself, the use of the lost card can be stopped reliably.

Incidentally, the Date (end) $D58_4$ in the negative list D58 created on each electronic money terminal $25_x$ ($25_1$ to $25_n$) can be set, for example, to a date on and after the balance in the lost card is determined and repayment is completed in Steps SP55 and SP56 in FIG. 21.

(2) Operation and Effect of the Embodiment

In the above configuration, the electronic money system 1 allows the user who uses an IC card 50 to select installment transactions. In that case, the transaction logs (electronic money log data D23) associated with installment transactions are accumulated first in the electronic money terminal $25_x$ and then gathered into the database 16C of the integrated server 16.

The integrated server 16 specifies 15% of the total installment balance as the monthly minimum amount billed to the user (minimum amount of payment by the user). Therefore, the user should pay any amount not less than the preset minimum amount of payment through a deposit terminal $21_x$ by a fixed day each month.

In this way, with the installment method in the electronic money system 1, the user pays by electronic money or cash using his/her IC card 50 within the electronic money system 1 instead of using an external system such as debiting installments from a bank account. This eliminates the need to specify the amount to be debited, which would otherwise be necessary when using direct debits from a bank account, an external system, and the user can pay any amount he/she likes (not less than a minimum amount of payment) by a fixed day.

Thus, in the electronic money system 1, the IC card 50 the user possesses functions as a substitute for a debit account in addition to functioning as a substitute for cash itself.

As the user pays part of the installment balance, the integrated server 16 subtracts the amount paid this time from the installment balance and saves the result of the subtraction as a new balance. Interest is charged on this new balance.

Thus, with the installment method in the electronic money system 1, since the user can decide the amount of payment freely, it becomes easier for the user to buy expensive commodities.

According to the above configuration, the transaction amounts to be paid in installments are accumulated as electronic money log data D23 in the database 16 of the integrated server 16 and the user pays monthly installments by accessing the integrated server 16C through a deposit terminal $21_x$, making it possible to decide monthly installments freely.

Thus, it is possible to implement an electronic money system 1 that makes full use of installment methods.

(3) Other Embodiments

Although the embodiment described above employs a contactless IC card 50, the present invention can also employ contact IC cards.

Also, although according to the embodiment described above, the transaction histories (electronic money log data D23) of IC cards 50 gathered in the electronic money terminals 25$_x$ are collected once a day by the electronic money management block 10 which then settles accounts once a month, the present invention can collect the transaction histories from the electronic money terminals 25$_x$ and settle accounts at any other frequency.

Besides, although according to the embodiment described above, the electronic money terminal 21$_x$ has incorporated the function of receiving installments, it is also possible to install a separate special-purpose payment machine.

Also, according to the embodiment described above, the user makes monthly installment payments by operating the electronic money terminal 21$_x$ for himself/herself. However, it can be so designed that when the user uses his/her IC card 50, the terminal that received the IC card 50 will deduct the minimum amount of payment from the IC card 50 once a month and send it to the integrated server 16 according to prior arrangements between the user and electronic money management block 10. In that case, if the user wants to pay not less than the minimum amount of payment, he/she can make the payment by operating the electronic money terminal 21$_x$ for himself/herself.

Besides, although according to the embodiment described above, an installment is paid once a month, it is also possible to adopt various payment frequencies.

Furthermore, although the embodiment described above sets the minimum amount of payment at 15% the installment balance, the present invention can use various other rates as the minimum amount of payment. Besides, a fixed amount can be used instead of a ratio to the installment balance.

The embodiment described above uses an IC card 50, but it is also possible to make a portable terminal such as a portable telephone, watch, and portable personal computer have the function of the IC card 50.

Figure 24:
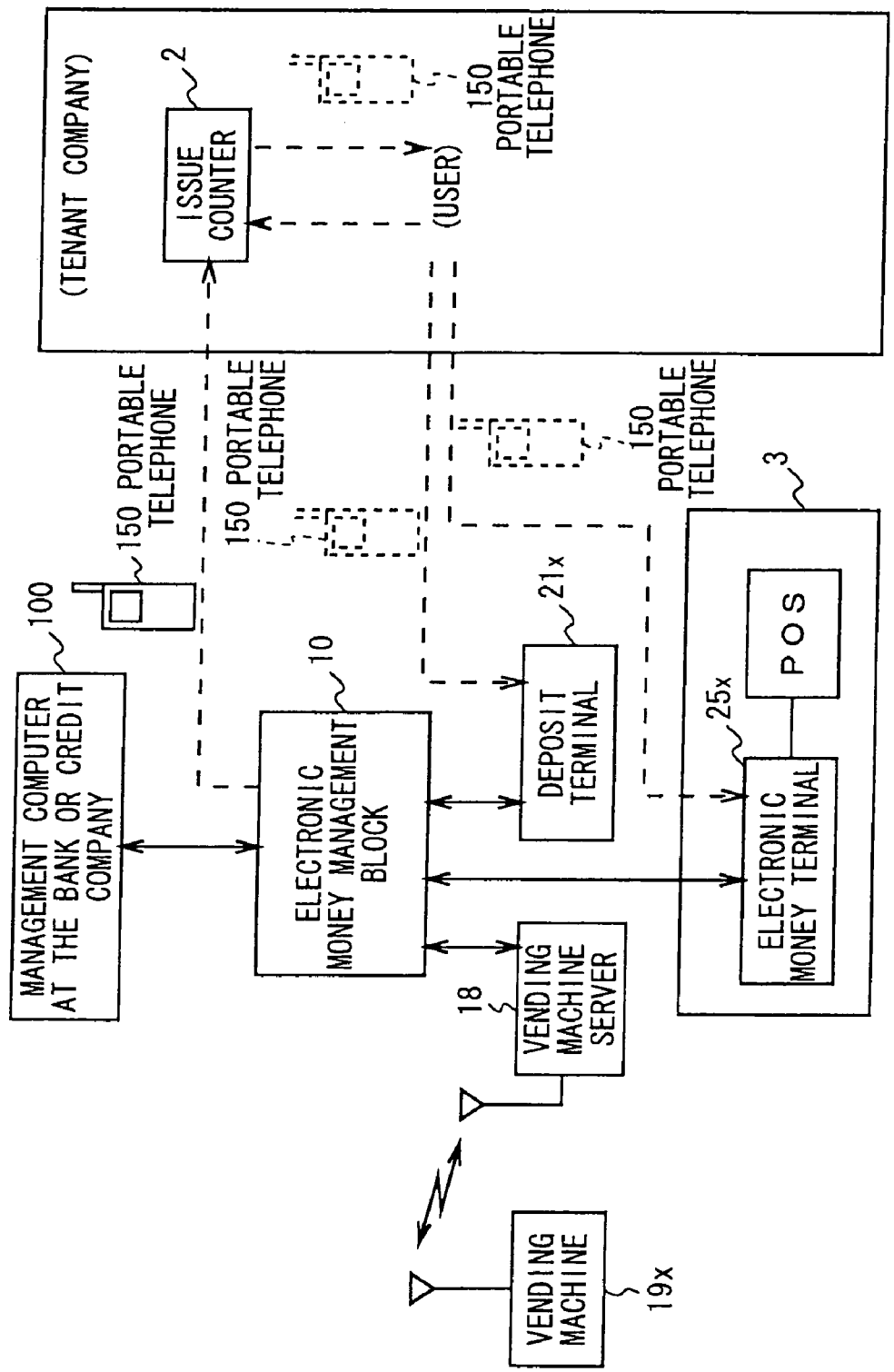
FIG. 24 is a block diagram showing the configuration of the electronic money system according to another embodiment.

For example, as shown in FIG. 24 with the components corresponding to those shown in FIG. 1 denoted by the same reference numerals as in FIG. 1, a portable telephone 150 may be used instead of the IC card 50. In this case, the portable telephone 150 can exchange data with the deposit terminals 21$_x$, electronic money terminals 25$_x$, and vending machines 19$_x$ in a contactless manner similarly to the case of the IC card 50. That is, as shown in FIG. 24, the portable telephone 150 has a configuration in which CPU 150A, memory 150B, transmit/receive circuit (RF) 150E for exchanging signals with a portable telephone network, baseband processor 150D for converting the RF (radio frequency) signals received by the transmit/receive circuit 150E into baseband signals and converting the baseband signals to be transmitted into RF signals, MMI (man machine interface) 150F which is an interface with a microphone 150G and speaker 150H, display portion 150I, keyboard 150J, modulator/demodulator circuit 53 for exchanging data with deposit terminals 21$_x$ and electronic money terminals 25$_x$, and loop antenna 52 are connected to a data bus BUS.

The CPU 150A has been designed to perform various operations according to an operation program stored in the memory 150B and control various circuits according to these operations. Process details of the CPU 150A are displayed, as required, on the display portion 150I consisting of a liquid crystal display panel or the like.

When the user enters the telephone number of a desired party, the keyboard 150J supplies data that represents this telephone number to the CPU 150A. The CPU 150A sends a connection request to the called party represented by the telephone number entered by the user, via the transmit/receive circuit 150E. The portable telephone network (not shown) connects lines according to the response from the called party. When the lines are connected, the transmit/receive circuit 150E supplies the RF signals received from the called party through an antenna for telephone conversations (not shown), to the baseband processor 150D, where the RF signals are converted into baseband signals. The baseband processor 150D supplies the resulting baseband signals to the MMI 150F and the voice signals from the called party is output as voice through the speaker 150H.

When the user enters voice through the microphone 150G, the MMI 150F supplies the input voice signals supplied from the microphone 150G to the baseband processor 150D, where the baseband signals are converted into RF signals. The baseband processor 150D sends the resulting RF signals to the portable telephone network through the transmit/receive circuit 150E in order for the RF signals to be sent to the called party connected through the line. In this way, the portable telephone 150 user can talk and exchange various information with the called party.

In addition to the above-described configuration, the portable telephone 150 comprises a modulator/demodulator circuit 53 and loop antenna 52 similar to those of the IC card 50 described with reference to FIG. 5: the coiled loop antenna 52 receives the electromagnetic waves emitted by data readers/writers 60 (FIG. 5) installed in the deposit terminal 21$_x$, electronic money terminal 25$_x$, and vending machine 19$_x$ and converts them into electrical signals while the modulation/demodulation circuit 53 modulates send data or demodulates receive data. The CPU 150A receives, through the bus BUS, the data received by the loop antenna 52, analyzes it, and generates send data.

Thanks to the capability to store various electronic money data in the memory 150B, the CPU 150A can exchange electronic money data with deposit terminals 21$_x$, electronic money terminals 25$_x$, and vending machines 19$_x$. This makes it possible to implement applications similar to those of the IC card 50 described above with reference to FIG. 5.

Incidentally, the functions of the IC card 50 may be added not only to a portable telephone, but also, for example, to a watch, personal computer, etc. carried by the user. As a method of adding the functions of the IC card 50 to portable electronic devices (portable telephones, watches, personal computers, etc.), the electronic devices may be designed such that the IC card 50 will be inserted into them.

Figure 25:
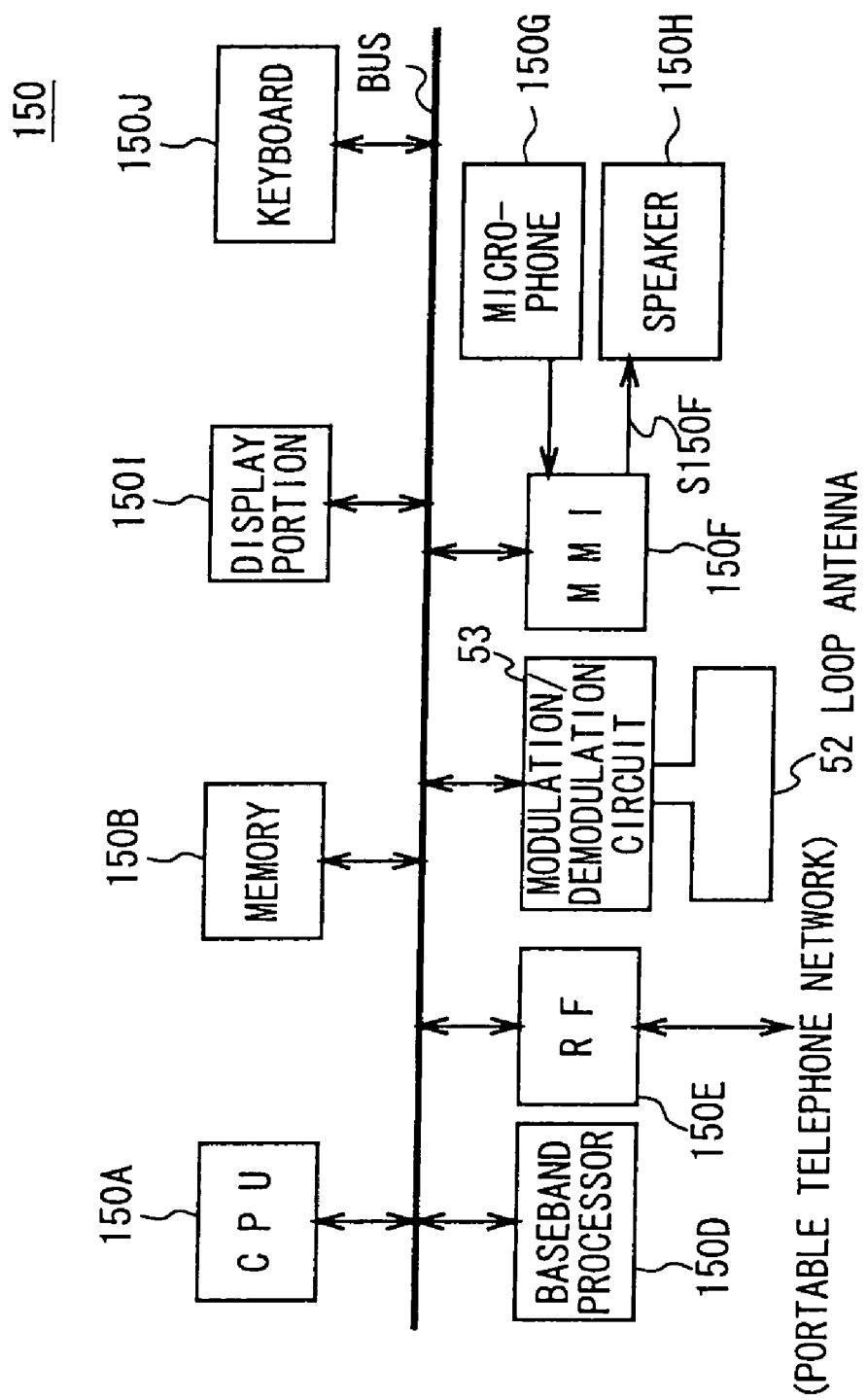
FIG. 25 is a block diagram showing the configuration of a portable telephone according to the other embodiment.
Figure 26:
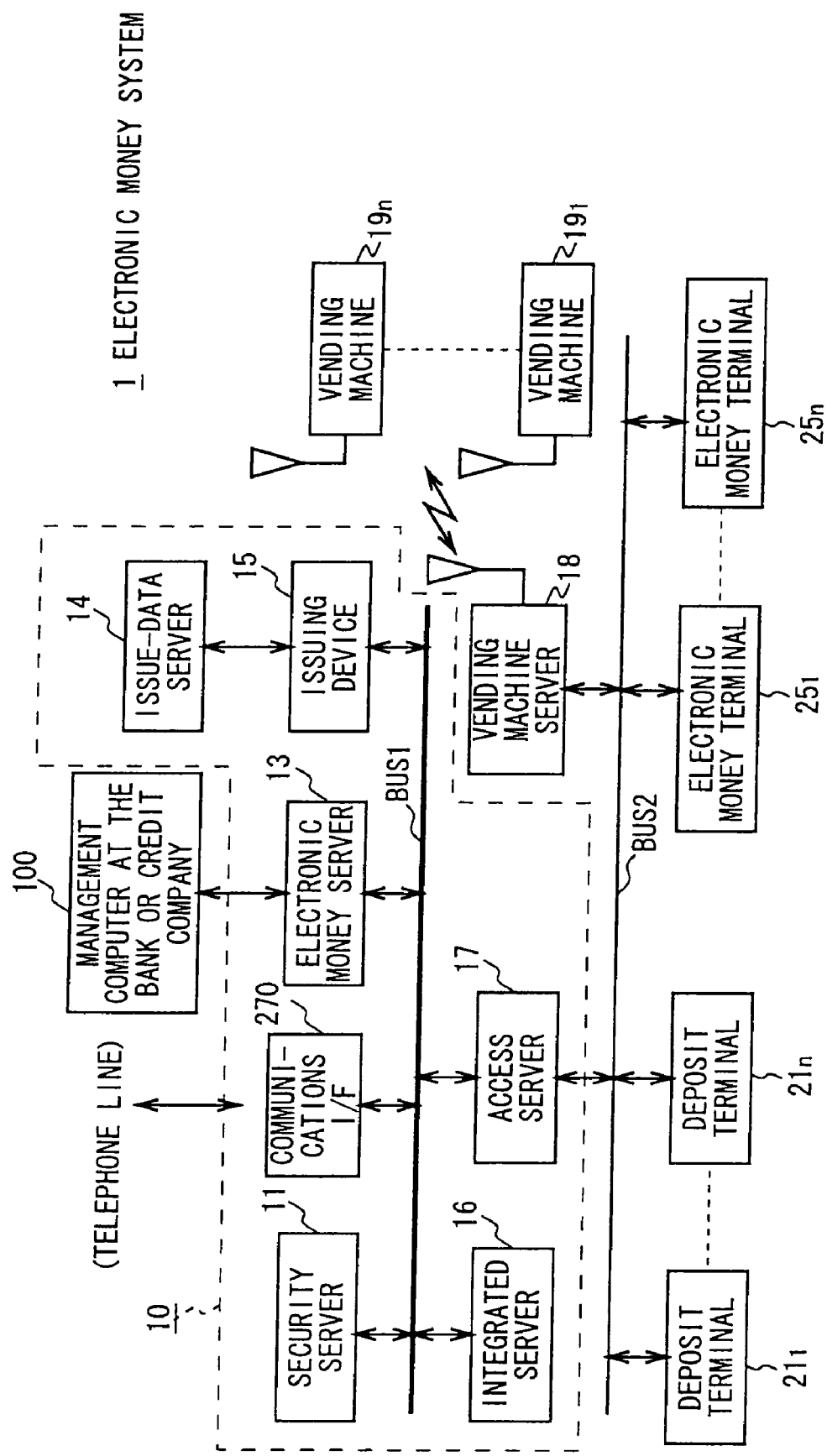
FIG. 26 is a block diagram showing the configuration of the electronic money management block according to the other embodiment.

Also, although in the embodiment described above, amount data is entered in the IC card 50 on the deposit terminal 21$_x$, it is possible to use, instead of the IC card 50, the portable telephone 150 (FIG. 25) that can exchange data with the electronic money terminals 25$_x$ and vending machines 19$_x$, by installing, in the electronic money management block 10, a communications interface 270 for communicating with the portable telephone 150 as shown in FIG. 26 with the components corresponding to those shown in FIG. 2 denoted by the same reference numerals as in FIG. 2, so that amount data will be entered into the portable telephone 150 through direct communications between the portable telephone 150 and electronic money management block 10 instead of using the deposit terminal 21$_x$. Incidentally, private lines can also be used instead of telephone lines for the communications between the portable telephone 150 and electronic money management block 10.

Besides, although the IC card 50 employed by the embodiment described above is dedicated to electronic money, other functions can also be added to it depending on the usage of the memory mounted in it: a personal identification function (identification of the user possessing the IC card 50 by checking it against pre-registered personal information) such as an employee ID and a function of electronic keys such as an entrance/exit key (means of allowing entrance into and exit from an office or room that requires security clearance) as well as functions of a season ticket, driver's license, passport, insurance card, point discount card, etc. Similarly, various functions can be added also to the portable telephone 150 and other electronic devices (watches, personal computers, etc.) that have the functions of the IC card 50 and that have been described above with reference to FIG. 25.

As described above, instead of debiting the amount data equivalent to consumption from an information card, the present invention accumulates the amount data equivalent to consumption as data on the transaction history of installment payments, receives part or all of the accumulated installment balance as an installment amount, subtracts the received installment amount from the installment balance to determine a new balance, and thereby allows the user to pay any part of the installment balance as an installment amount.

INDUSTRIAL APPLICABILITY

The present invention relates to a transaction method employing electronic devices which contain monetary value as electronic money as well as to an electronic money system for it. It can be used when paying transaction amounts in installments.

The invention claimed is:

1. An electronic money system comprising:
a plurality of electronic money terminals, an electronic money terminal of said plurality of electronic money terminals receiving electronic money log data from an electronic device, said electronic money log data including electronic money,
for the purchase of a commodity or the reception of a service, said electronic money terminal receiving a transaction amount and a payment method indication, said transaction amount being said purchase price of said commodity or the monetary value of said service, said payment method indication indicating payment of said transaction amount using said electronic money or installment payments,
wherein said electronic money terminal updates said electronic money log data with said transaction amount when said payment method indication indicates said payment by said installment payments,
wherein said updated electronic money log data is stored within said electronic money terminal, and
wherein said electronic device stores said updated electronic money log data.

2. The electronic money system according to claim 1, wherein said electronic money terminal updates said electronic money log data by decrementing said electronic money in the amount of said transaction amount when said payment method indication indicates said payment by said electronic money.

3. The electronic money system according to claim 2, wherein, when said transaction amount is greater than said electronic money, the difference between said transaction amount and said electronic money is stored within said electronic money terminal as credit card transaction information.

4. The electronic money system according to claim 3, further comprising:
an electronic money management block that captures electronic money log data stored within each money terminal of said plurality of electronic money terminals.

5. The electronic money system according to claim 4, wherein said electronic money management block calculates the sum total transaction amounts for said electronic device during a particular time interval.

6. The electronic money system according to claim 4, wherein said electronic money management block sends to a bank or credit company the sum total amount of credit card transaction information for said electronic device during a particular time interval.

7. The electronic money system according to claim 1, wherein said electronic money terminal stores therein electronic money log data for prior usages of said electronic device.

8. The electronic money system according to claim 1, wherein said electronic money terminal receives electronic money log data from another electronic device.

9. The electronic money system according to claim 1, wherein said electronic money terminal receives other electronic money log data from said electronic device.

10. The electronic money system according to claim 1, further comprising:
a deposit terminal that receives currency and transmits amount data to said electronic device, said amount data representing the monetary value of said currency being transmitted, said electronic device using said amount data to increment electronic money in the amount of said monetary value.

11. The electronic money system according to claim 1, wherein said electronic device is a portable terminal.

12. The electronic money system according to claim 1, wherein said electronic device is an information card.

13. The electronic money system according to claim 12, wherein said information card is a contactless information card that sends and receives said electronic money log data in a contactless manner.

14. A transaction method using an electronic money system, the method comprising:
receiving electronic money log data from an electronic device, said electronic money log data including electronic money, an electronic money terminal of a plurality of electronic money terminals receiving said electronic money log data;
receiving a transaction amount for the purchase of a commodity or the monetary value of a service;
receiving a payment method indication for said purchase of said commodity or the payment of said service, said payment method indication indicating payment of said transaction amount using said electronic money or installment payments;
updating said electronic money log data with said transaction amount when said payment method indication indicates said payment by said installment payments;
storing said updated electronic money log data within said electronic money terminal; and
storing said updated electronic money log data within said electronic device,
wherein said electronic money terminal updating said electronic money log data.

15. The transaction method according to claim 14, further comprising:
updating said electronic money log data by decrementing said electronic money in the amount of said transaction amount when said payment method indication indicates said payment by said electronic money.

16. The transaction method according to claim 14, further comprising:

storing the difference between said transaction amount and said electronic money within said electronic money terminal as credit card transaction information when said transaction amount is greater than said electronic money.

17. The electronic money system according to claim 16, further comprising:

capturing electronic money log data stored within each money terminal of said plurality of electronic money terminals.

18. The transaction method according to claim 17, further comprising:

calculating the sum total transaction amounts for said electronic device during a particular time interval.

19. The transaction method according to claim 17, further comprising:

sending to a bank or credit company the sum total amount of credit card transaction information for said electronic device during a particular time interval.

20. The transaction method according to claim 14, further comprising:

storing electronic money log data for prior usages of said electronic device.

21. The transaction method according to claim 14, further comprising:

receiving electronic money log data from another electronic device.

22. The transaction method according to claim 14, further comprising:

receiving other electronic money log data from said electronic device.

23. The transaction method according to claim 14, further comprising:

receiving currency;

transmitting amount data to said electronic device, said amount data representing the monetary value of said currency being transmitted; and using said amount data to increment electronic money in the amount of said monetary value.

* * * * *